(12) United States Patent
Galipeau et al.

(10) Patent No.: US 6,249,913 B1
(45) Date of Patent: Jun. 19, 2001

(54) AIRCRAFT DATA MANAGEMENT SYSTEM

(75) Inventors: Steven R. Galipeau, Redmond; John G. Wade, Woodinville; Rory G. Briski, Everett; Mark A. Peabody; Michael M. Mowry, both of Redmond, all of WA (US); Gregg D. Armstrong, Lake City, FL (US); Craig L. Burgess, Redmond, WA (US); Kenneth L. Gray, Kirkland, WA (US); Garrett R. Spears, Bellevue, WA (US)

(73) Assignee: General Dynamics OTS (Aerospace), Inc., Redmond, WA (US)

( * ) Notice: Subject to any disclaimer, the term of this patent is extended or adjusted under 35 U.S.C. 154(b) by 0 days.

(21) Appl. No.: 09/411,063

(22) Filed: Oct. 4, 1999

Related U.S. Application Data

(60) Provisional application No. 60/103,823, filed on Oct. 9, 1998.

(51) Int. Cl.⁷ .............................. H04N 7/08; G05B 15/00
(52) U.S. Cl. ................................ 725/76; 725/77; 725/79; 725/82; 700/83; 700/295
(58) Field of Search ...................... 700/83, 295; 709/208; 244/118.5; 725/76, 77, 82, 79

(56) References Cited

U.S. PATENT DOCUMENTS

| | | | |
|---|---|---|---|
| 3,753,072 | * 8/1973 | Jurgens | 320/163 |
| 3,795,771 | 3/1974 | Gunderson et al. | 370/242 |
| 4,584,603 | 4/1986 | Harrison | 725/76 |
| 4,763,360 | 8/1988 | Daniels et al. | 455/3.06 |
| 4,774,514 | 9/1988 | Hildebrandt et al. | 340/971 |
| 4,835,604 | 5/1989 | Kondo et al. | 725/76 |
| 4,866,515 | 9/1989 | Tagawa et al. | 725/77 |
| 4,896,209 | 1/1990 | Matsuzaki et al. | 725/12 |
| 4,920,432 | 4/1990 | Eggers et al. | 386/96 |
| 4,975,696 | 12/1990 | Salter, Jr. et al. | 340/973 |
| 5,014,267 | 5/1991 | Tompkins et al. | 370/259 |
| 5,123,015 | 6/1992 | Brady, Jr. et al. | 370/539 |
| 5,220,130 | 6/1993 | Walters | 174/36 |
| 5,220,419 | 6/1993 | Sklar et al. | 725/76 |
| 5,289,272 | 2/1994 | Rabowsky et al. | 725/76 |
| 5,311,302 | 5/1994 | Berry et al. | 348/14.03 |
| 5,347,632 | 9/1994 | Filepp et al. | 709/202 |
| 5,389,006 | * 2/1995 | Nonchese | 439/354 |
| 5,404,567 | 4/1995 | DePietro et al. | 455/3.06 |
| 5,440,642 | 8/1995 | Denenberg et al. | 381/71.13 |
| 5,481,615 | 1/1996 | Eatwell et al. | 381/71.6 |
| 5,542,487 | 8/1996 | Schultz, et al. | 178/4.1 A |
| 5,555,466 | 9/1996 | Scribner et al. | 725/75 |
| 5,557,541 | 9/1996 | Schulhof et al. | 700/94 |

(List continued on next page.)

OTHER PUBLICATIONS

IEEE Standard 1073.4.1, IEEE Standard for Medical Device Communications—Physical Layer Interface—Cable Connected, IEEE Database, pp. i–65.*

(List continued on next page.)

*Primary Examiner*—William Grant
*Assistant Examiner*—Paul Rodriguez
(74) *Attorney, Agent, or Firm*—Gregory S. Rosenblatt; Paul A. Levy; Wiggin & Dana

(57) ABSTRACT

An aircraft data management system provides a passenger seated on the aircraft with a number of entertainment and productivity enhancing options. Such options include, without limitation, video, audio, internet, airplane systems data and power. Located proximate to each seat group is an integrated seat box that includes a network interface card that identifies a requesting passenger for proper directing of the required data and/or power from devices that interface with a network controller back to the requesting passenger. Both on-aircraft and off-aircraft devices may be accessed by the system. While particularly drawn to aircraft, the data management system is also applicable to other venues have identifiable seating locations such as buses, passenger ships, hotels and auditoriums.

39 Claims, 28 Drawing Sheets

U.S. PATENT DOCUMENTS

| | | | |
|---|---|---|---|
| 5,568,484 | | 10/1996 | Margis .................................. 370/452 |
| 5,640,297 | * | 6/1997 | Labaze .................................. 361/683 |
| 5,666,291 | * | 9/1997 | Scott et al. ........................... 709/250 |
| 5,745,159 | | 4/1998 | Wax et al. .............................. 725/76 |
| 5,754,445 | | 5/1998 | Jouper et al. ........................ 700/295 |
| 5,790,175 | * | 8/1998 | Sklar et al. ............................ 725/76 |
| 5,790,787 | | 8/1998 | Scott et al. ........................... 709/250 |
| 5,793,614 | | 8/1998 | Tollbom ................................ 361/732 |
| 5,808,661 | * | 9/1998 | Infiesto et al. .................... 348/14.01 |
| 5,831,805 | | 11/1998 | Sekine et al. ......................... 361/86 |
| 5,835,127 | | 11/1998 | Booth et al. ........................... 725/76 |
| 5,848,367 | | 12/1998 | Lotocky et al. ...................... 701/36 |
| 5,945,631 | * | 8/1999 | Henrikson et al. .................... 174/34 |
| 5,959,596 | | 9/1999 | McCarten et al. ....................... 345/2 |

OTHER PUBLICATIONS

David A. Stamper, Local Area Networks, Addison Wesley Longman, Inc., ISBN 0–8053–7729–8 pp. 54–58.*

"Data compression increases available video channels; in–flight passenger entertainment improves as a result of data compression technology", Oct. 16, 1991, Flight International, p. 13.

Reed, Arthur ,"To make in–flight amusement pay", Dec. , 1991, Air Transport World, p. 107.

Norris, Guy, "The systematic approach; electric systems in the Boeing 777", Aug. 31, 1994, Flight International, p. 73.

Daly, Kieran, "Entertaining engineers; airlines experiencing problems with interactive in–flight–entertainment technology", Apr. 5, 1995, Flight International, p. 32.

"Optibase & BEA Make MPEG Fly!", Digital Video News, July 1995, p. 1.

"The IFE System that Takes You into the Future—NOW!", Digital Video News, Jul. 1995.

"Formation Introduces First IFE Media Server Meeting Requirements of Microsoft Interactive Television Software", Sep. 11, 1995, Business Wire, page 9111382.

"Concurrent Computer and GTE Airfone demonstrate video breakthrough for in–flight entertainment", Sep. 12, 1995, Business Wire, p. 9121314.

"First totally digitalized in–flight entertainment system . . . . ", 1995, Business Wire.

"BE Aerospace interactive video system successfully debuts on British Airways B747; Company awarded $33 million in new seating programs", Business Wire, Nov. 21, 1995, p. 11210095.

"Video–On–Demand Trial Starts on Alitalia Airlines", 1995, European Media Business & Finance.

"TNCi Continues Airview™ Enhancement with Telephone Interface", Nov. 1995, PR Newswire.

Krause, Reinhardt, "Live video peps up in–flight entertainment; Technology Information", Electronic News (1991), Jan. 29, 1996, p. 18.

Harbison, Ian and Dunn, Graham, "Two–Way Street", March 1996, Inflight, p. 14–18.

Velocci, Jr., Anthony L., "Airframers Force Discipline in High–Stakes IFE Market", Aviation Week & Space Technology, Mar. 1996, p. 41–43.

"AirView Now Provides Customers With 500 Hours of Simultaneous Video", PR Newswire, Aug. 9, 1996, p. 809ATF001.

"The Network Connection and Lockheed Martin Pursue AirView In–Flight Entertainment Agreement", PR Newswire, Dec. 5, 1996, p. 1205ATTH014.

"British Airways Selects Rockwell Collins for Advanced In–Flight Entertainment System Technology", PR Newswire, Feb. 16, 1998, p. 216LAMM001.

"AirViewR All–Digital In–Flight Entertainment Flies Aboard Fairlines in Airline Industry First", PR Newswire, Jun. 11, 1998, p. 611NYTH008.

Henderson, Danna K., "IFE goes digital", Air Transport World, Oct. 1, 1998, p. 99.

Kelly, Emma, "Facing the future: The picture is bri.", Flight International, Oct. 7, 1998, p. 36.

Kelly, Emma, "Growing Pains", Flight International, Oct. 7, 1998, p. 34.

"Interactive Entertainment Limited Announces Strategic Alliance With the Network Connection, Inc. ", Business Wire, Oct. 12, 1998, p. 1266.

Gallacher, Jackie, "Money well spent?", Airline Business, Jan. 1999, p. 2.

* cited by examiner

ARINC | Site Map | Search | Contact Us

Products & Services | News | Corporate Info | Employment | Industry Activies

About ARINC ▽ Go!

Products and Services

Air/Ground Communications

Airport Systems

Global Networking, Trading, and Content Services

Information Systems and Services

Surface Transportation Systems

Systems Engineering, Development, and Integration

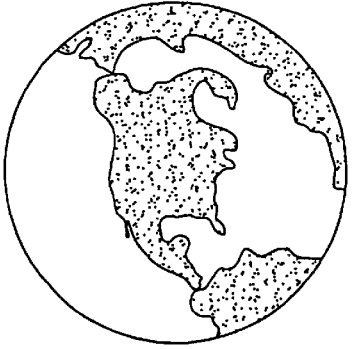

Aviation Industry Forums

Airlines Electronic Engineering Committee

Avionics Maintenance Conference

Flight Simulator Engineering and Maintenance Conference

Frequency Management

ARINC Characteristics and Document Ordering

---

ARINC News

To better serve our customers, ARINC is now taking Customer Services calls on a 24 x 7 basis. See our Contact Us page for information on how to reach us.

ARINC Appoints Graham Lake Managing Director, Europe

ARINC Testing Highlights Issues in 2.4 GHz Wireless Network Planning

ARINC's Dominium System Helps Recover Stolen Trailer

Air Transat Selects ARINC for Satellite Service

ARINC Delivers 25 Million PDC Messages

ARINC Enhances IP Network

More News ...

---

The pages of this ARINC website have been and continue to be a primary method for ARINC to disseminate Year 2000 statements and readiness disclosures as defined by the Year 2000 Information and Readiness Disclosure Act, Pub. L. No. 105-271 ("Act"). Pursuant to the Act, this website is hereby designated a "Year 2000 Internet Website."

More on ARINC's Y2K Policy

© 1999 ARINC Incorporated

FIG. 10a PRIOR ART

| ARINC | | Site Map | Search | Contact Us |
| --- | --- | --- | --- | --- |
| Products & Services | News | Corporate Info | Employment | Industry Activies |

Document Ordering

Effective April 5, 1999

Introduction

AEEC Overview

The Airlines Electronic Engineering Committee (AEEC) is an international standards organization comprising major airline operators and other airspace users. AEEC member airlines work closely with industry, including airframe manufacturers, avionics suppliers and component suppliers to achieve standardization of air transport avionics equipment and systems. The resulting documents are a product of industry consensus.

For five decades, AEEC has been instrumental in setting standards for air transport avionics equipment and systems. The many benefits include industry-defined products that can be produced on a competitive basis by various suppliers. AEEC standards enable airlines and other avionics users to achieve economies of scale in the procurement of avionics. This is achieved through the standardization of avionics form, fit and function and definition of aviation communication systems.

ARINC Standards

ARINC publishes the standards produced by the AEEC. Three types of AEEC documents are available:

- ARINC Characteristics
- ARINC Specifications
- ARINC Reports

ARINC Characteristics

ARINC Characteristics define the form, fit and function of avionics equipment. AEEC has produced two predominant families of Characteristics - ARINC 700-series and ARINC 500-series.

ARINC 700-series of Characteristics are the most current. These standards were developed starting in the early 1980's for the B-757, B-767, A-310 and MD-80 series aircraft. In many cases these specifications are digital versions of the older analog specs.

FIG.10b

The emergence of digital avionics has provided greater opportunities for equipment integration. Thus, new standards were written for highly integrated systems such as the Flight Management System (FMS) and the Air Data/Inertial Reference System (ADIRS). The ARINC 700-series of Characteristics refer to the ARINC 600-series of supporting documents. AEEC continues to develop new ARINC 700-series Characteristics and new ARINC 600-series supporting documents today.

The ARINC 500-series of Characteristics define older analog avionics equipment. Most of these standards were prepared for the introduction of jet aircraft in the 1960s. These specifications are used widely on the B-727, DC-9, DC-10, and early models of B-737, B-747 and A-300 aircraft. Many of these Characteristics are so successful that they continue to be used in modern turbofan aircraft using today's technology. The ARINC 500-series of Characteristics refer to the ARINC 400-series of supporting documents.

ARINC Specifications

ARINC Specifications are principally used to define: (1) the physical packaging and mounting of avionics equipment, (2) data communication standards (3) a computer high-level language. Examples include ARINC Specification 429, Digital Information Transfer System (DITS) and ARINC Specification 600, Air Transport Avionics Equipment Interfaces.

ARINC Reports

ARINC Reports provide guidelines or general information found by the airlines to be good practices. Many Reports refer to avionics maintenance and support.

Annual Subscriptions

Regular and Special Subscriptions plans are available from the ARINC Document Section. Each plan is tailored to suit your needs.

Regular Subscriptions are available to individuals who desire current draft documents and reports pertaining to specific AEEC Subcommittee activities.

Special Subscriptions are customized to suit the needs of corporate users. This generally includes regular mailing of documents pertaining to all AEEC activities, new Gray Cover releases and electronic documents. There are many benefits offered to ARINC Special Subscribers.

For further information concerning ARINC Subscriptions, please contact Vanessa Mastros at ARINC. Phone 410-266-2381, fax 410-266-2047, or e-mail vam@arinc.com. You may also download the Special Subscriber Information Package which will help gather the proper information necessary for an accurate quote.

For ordering documents, please contact the Document Section. Phone 410-266-4117, fax 410-266-2047, or e-mail ch@arinc.com.

FIG.10c

- ARINC Standards on CD-ROM - Now Available!
- ARINC 700 Series - Equipment Characteristics
- ARINC 600-Series Reports and Specifications
- ARINC 500-Series Equipment Characteristics
- ARINC 400-Series Reports and Specifications
- Other Documents
- AEEC Materials on CD-ROM
- Index of Newsletters and Special Reports
- Documents no longer held in inventory
- ARINC Document Prices by Sets or Series
- Ordering Information
- Download Order Form in PDF Format Browse a list of links to Major Air Transport Industry Organizations.

For more information, contact:
Cheryl Hrisko
ch@arinc.com
410-266-4117
Fax: 410-266-2047

Home | Site Map | Search | Contact Us
Products & Services | News | Corporate Info
Employment | Industry Activities © 1999 ARINC Incorporated
Home > Industry Activities > Characteristics > Document Ordering

FIG.10d

| ARINC | | Site Map \| Search \| Contact Us |
|---|---|---|
| | Products & Services \| News \| Corporate Info \| Employment \| Industry Activies | |

ARINC 400-Series Reports & Specifications

Review the Ordering Information.
Download the Order Form in PDF Format.

Download the Document List in PDF format.

To see the description of a particular document, click on the document number link.

| DOC No. | PRICE US | PRICE NON-US | SUBJECT | LAST PRINT |
|---|---|---|---|---|
| 404A | 99.00 | 101.00 | Air Transport Equipment Cases and Racking | 3/74 |
| 404B | 99.00 | 101.00 | Connectors, Electrical, Rack and Panel, Rectangular, Rear Release Crimp Contacts | 4/98 |
| 406A* | 84.00 | 87.00 | Airborne Electronic Equipment Standard Interconnections and Index Pin Codes | 7/72 |
| 407-1 | 68.00 | 72.00 | ARINC Synchro System Manual (Combined Issue of Report 407 and 407-1, "ARINC Synchro Signal Practices") | 6/61 |
| 408A | 68.00 | 72.00 | Air Transport Indicator Cases and Mounting | 12/76 |
| 410-1 | 46.00 | 51.00 | Mark 2 Standard Frequency Selection System and Mounting | 10/65 |
| 413A | 84.00 | 87.00 | Guidance for Aircraft Electrical Power Utilization and Transient Protection | 12/76 |
| 419-3 | 68.00 | 72.00 | Digital Data System Compendium | 11/84 |
| 421 | 46.00 | 51.00 | Guidance for Standard Subdivision of ATA Spec 100 Numbering System for Avionics | 10/71 |

FIG.10e

| | | | | |
|---|---|---|---|---|
| 422 | 46.00 | 51.00 | Guidance for Modification Status Indicators and Avionics Service Bulletins | 2/72 |
| 424-13 | 99.00 | 101.00 | Navigation System Data Base | 12/95 |
| 428 | 46.00 | 51.00 | Considerations for Avionics Network Design | 10/95 |
| 429P1-15 | 68.00 | 72.00 | Mark 33 Digital Information Transfer System (DITS) - Part 1 - Functional Description and Word Formats | 9/95 |
| 429P2-15 | 68.00 | 72.00 | Mark 33 Digital Information Transfer System (DITS) - Part 2 - Discrete Data Words | 3/96 |
| 429P3-16 | 68.00 | 72.00 | Mark 33 Digital Information Transfer System (DITS) - Part 3 - File Data Transfer Techniques | 7/97 |
| 429-ALL | 147.00 | 175.00 | Mark 33 Digital Information Transfer System (DITS) - Parts 1, 2, 3 - Special Discount Rate | |
| 429 | 100.00 | 100.00 | Electronic Diskette Copy of Data Labels in Microsoft Word 6.0 and Formats in WordPerfect 5.1 | |
| 431 | 68.00 | 72.00 | No Fault Found - A Case Study | 4/96 |
| 453 | 46.00 | 51.00 | Very High Speed (VHS) Bus *(not formally adopted by AEEC - available in draft form only)* | 9/78 |

- "Dash number" following a document number indicates that all Supplements numbered 1 through the dash number are included within the document.

\* Although still available from ARINC, this document is OBSOLETE, meaning the standard is no longer recommended for use or maintained current for new equipment designs. (The equipment designed to this category of AEEC standard has served the industry well. Equipment currently in use that complies with these standards should continue to be used in airline service.)

\*\* Supplements can be ordered separately. The price for each one is $15.00 mailed within North America, and $17.00 outside North America.

\*\*\* Adopted by AEEC, but not yet available for publication. Call the Document Section for status of these documents.

FIG.10f

For more information, contact:
Cheryl Hrisko
ch@arinc.com
410-266-4117
Fax: 410-266-2047

Home | Site Map | Search | Contact Us
Products & Services | News | Corporate Info
Employment | Industry Activities © 1999 ARINC Incorporated
Home > Industry Activities> Characteristics> 400 SERIES

FIG.10g

ARINC | Site Map | Search | Contact Us
Products & Services | News | Corporate Info | Employment | Industry Activies

ARINC 600-Series Reports and Specifications

Review the Ordering Information.
Download the Order Form in PDF Format.

Download the Document List in PDF format.

To see the description of a particular document, click on the document number link.

| DOC No. | PRICE US | PRICE NON-US | SUBJECT | LAST PRINT |
|---|---|---|---|---|
| 600-12 | 99.00 | 101.00 | Air Transport Avionics Equipment Interfaces | 11/98 |
| 601 | 68.00 | 72.00 | Control/Display Interfaces | 2/81 |
| 602A-2 | 46.00 | 51.00 | Test Equipment Guidance | 2/96 |
| 603-1 | 46.00 | 51.00 | Airborne Computer Data Loader | 11/85 |
| 604-1 | 68.00 | 72.00 | Guidance for Design and Use of Built-In Test Equipment (BITE) | 10/88 |
| 605 | 46.00 | 51.00 | Users Guide for ARINC 616 Avionics Subset of ATLAS Language | 2/85 |
| 606-1 | 68.00 | 72.00 | Guidance for Electrostatic Sensitive Device Utilization and Protection | 7/93 |
| 607-3 | 46.00 | 51.00 | Design Guidance for Avionic Equipment | 8/98 |
| 608-1* | 68.00 | 72.00 | Standard Modular Avionics Repair and Test System (SMART) | 9/89 |
| 608A | 99.00 | 101.00 | Design Guidance for Avionics Test Equipment, Part 1 - System Definition | 1/93 |
| 609 | 46.00 | 51.00 | Design Guidance for Aircraft Electrical Power Systems | 1/87 |
| 610-1 | 68.00 | 72.00 | Guidance for Design and Integration of Aircraft Avionics Equip. in Simulators | 2/92 |

FIG.10h

| | | | | |
|---|---|---|---|---|
| 610A-1 | 99.00 | 101.00 | Guidance for Use of Avionics Equipment and Software in Simulators | 2/99 |
| 611-1 | 68.00 | 72.00 | Guidance for the Design and Installation of Fuel Quantity Systems | 1/99 |
| 612 | 46.00 | 51.00 | BITE Glossary | 12/86 |
| 613 | 68.00 | 72.00 | Guidance for Using the Ada Programming Language in Avionic Systems | 1/88 |
| 614 | 68.00 | 72.00 | Standard Firmware Loader for Avionics Shops | 9/89 |
| 615-3 | 84.00 | 87.00 | Airborne Computer High Speed Data Loader | 8/92 |
| 617 | 46.00 | 51.00 | Guidance for Avionics Certification and Configuration Control *(not formally adopted by AEEC-available in draft only)* | 12/90 |
| 618-3 | 99.00 | 101.00 | Air-Ground Character-Oriented Protocol Specification | 9/98 |
| 619-1 | 68.00 | 72.00 | ACARS Protocols for Avionic End Systems | 1/97 |
| 620-3 | 99.00 | 101.00 | Data Link Ground System Standard and Interface Specification | 12/97 |
| 622-3 | 99.00 | 101.00 | ATS Data Link Applications Over ACARS Air-Ground Network | 9/98 |
| 623-1 | 46.00 | 51.00 | Character-Oriented Air Traffic Service (ATS) Applications | 12/97 |
| 624-1 | 84.00 | 87.00 | Design Guidance for Onboard Maintenance System | 8/93 |
| 625 | 68.00 | 72.00 | Industry Guide for Test program Set (TPS) Quality Management | 3/96 |
| 626-3 | 107.00 | 115.00 | Standard ATLAS for Modular Test | 1/95 |
| 627-1 | 107.00 | 115.00 | Programmers Guide for SMART™ Systems using ARINC 626 ATLAS Supplement 2 | 8/92 *** |
| 628P1-1 | 84.00 | 87.00 | Cabin Equipment Interfaces (CEI), Part 1, Cabin Management and Entertainment System Peripherals | 12/93 |
| 628P2 | 68.00 | 72.00 | Cabin Equipment Interfaces | 12/96 |

FIG.10i

| | | | | |
|---|---|---|---|---|
| | | | (CEI), Part 2, Cabin Management and Entertainment System Seat Interfaces | |
| 628P3 | 68.00 | 72.00 | Cabin Equipment Interfaces (CEI), Part 3, Cabin Management and Entertainment, System In-Flight Entertainment System to Aircraft | 3/97 |
| 628P4A | 68.00 | 72.00 | Cabin Equipment Interfaces (CEI), Part 4A, Cabin Management and Entertainment System - Cabin Distribution System (CDS) - Daisy Chain | *** |
| 628P4B | 68.00 | 72.00 | Cabin Equipment Interfaces (CEI), Part 4B, Cabin Managmeent and Entertainment System - Cabin Distribution System (CDS) - Star Wiring | *** |
| 629P1-5 | 99.00 | 101.00 | Multi-Transmitter Data Bus, Part 1, Technical Description | 3/99 |
| 629P2-2 | 107.00 | 115.00 | Multi-Transmitter Data Bus, Part 2, Application Guide | 2/99 |
| 631-2 | 46.00 | 51.00 | Aviation Packet Communications Functional Description | 12/95 |
| 632 | 46.00 | 51.00 | Gate-Aircraft Terminal Environment Link (Gatelink) | 12/94 |
| 634 | 99.00 | 101.00 | HF Data Link System Design Guidance Material | 8/96 |
| 635-2 | 68.00 | 72.00 | HF-Data Link Protocols | 2/98 |
| 636 | 68.00 | 72.00 | Onboard Local Area Network (OLAN) | 1/93 |
| 637 | 68.00 | 72.00 | Internetworking Specification | 9/93 |
| 638 | 68.00 | 72.00 | OSI Upper Layer Specification | 2/93 |
| 640 | 46.00 | 51.00 | Resolution of Inservice Anomallies through ASAPP | 9/97 |
| 644 | 68.00 | 72.00 | Portable Maint. Access Terminal | 5/93 |
| 644A | 46.00 | 51.00 | Portable Multi-Purpose Access Terminal (PMAT) | 8/96 |
| 646 | 46.00 | 51.00 | Ethernet Local Area Network (ELAN) | 12/95 |
| 650 | 99.00 | 101.00 | Integrated Modular Avionics Packaging and Interfaces | 7/94 |
| 651-1 | 99.00 | 101.00 | Design Guidance for Integrated Modular Avionics | 3/99 |
| 652 | 99.00 | 101.00 | Guidance for Avionics Software | 1/93 |

FIG.10j

|      |       |        | Management | |
|------|-------|--------|------------|------|
| 653  | 84.00 | 87.00  | Avionics Application Software Standard Interface | 1/97 |
| 654  | 99.00 | 101.00 | Environmental Design Guidelines for Integrated Modular Avionics | 12/94 |
| 655  | 68.00 | 72.00  | Remote Data Concentrator (RDC) Generic Description | 4/99 |
| 659  | 99.00 | 101.00 | Backplane Data Bus | 12/93 |
| 660  | 46.00 | 51.00  | CNS/ATM Avionics, Functional Allocation and Recommended Architectures | 12/95 |

- "Dash number" following a document number indicates that all Supplements numbered 1 through the dash number are included within the document.

\* Although still available from ARINC, this document is OBSOLETE, meaning the standard is no longer recommended for use or maintained current for new equipment designs. (The equipment designed to this category of AEEC standard has served the industry well. Equipment currently in use that complies with these standards should continue to be used in airline service.)

\*\* Supplements can be ordered separately. The price for each one is $15.00 mailed within North America, and $17.00 outside North America.

\*\*\* Adopted by AEEC, but not yet available for publication. Call the Document Section for status of these documents.

For more information, contact:
Cheryl Hrisko
ch@arinc.com
410-266-4117
Fax: 410-266-2047

Home | Site Map | Search | Contact Us
Products & Services | News | Corporate Info
Employment | Industry Activities © 1999 ARINC Incorporated
Home > Industry Activities> Characteristics> 600 SERIES

FIG.10k

| ARINC | | Site Map \| Search \| Contact Us |
|---|---|---|
| | Products & Services \| News \| Corporate Info \| Employment \| Industry Activies | |

ARINC 700-Series Equipment Characteristics

Review the Ordering Information.
Download the Order Form in PDF Format.

Download the Document List in PDF format.

To see the description of a particular document, click on the document number link.

| DOC No. | PRICE US | PRICE NON-US | SUBJECT | LAST PRINT |
|---|---|---|---|---|
| 701-1 | 68.00 | 72.00 | Flight Control Computer System | 4/83 |
| 702-6 | 99.00 | 101.00 | Flight Management Computer | 6/94 |
| 702A | 99.00 | 101.00 | Advanced Flight Management Computer System | 12/96 |
| 703-2 | 46.00 | 51.00 | Thrust Control Computer | 10/83 |
| 704-7 | 68.00 | 72.00 | Inertial Reference System | 3/99 |
| 704A | 68.00 | 72.00 | Inertial Refernce Systems | 3/99 |
| 705-5 | 68.00 | 72.00 | Attitude and Heading Reference System | 4/85 |
| 706-4 | 68.00 | 72.00 | Subsonic Air Data System | 1/88 |
| 707-6 | 68.00 | 72.00 | Radio Altimeter | 3/97 |
| 708-6 | 84.00 | 87.00 | Airborne Weather Radar | 11/91 |
| 708A-2 | 84.00 | 87.00 | Airborne Weather Radar with Forward Looking Windshear Detection Capability | 4/98 |
| 709-8 | 84.00 | 87.00 | Airborne Distance Measuring Equipment | 10/88 |
| 709A-1 | 99.00 | 101.00 | Precision Airborne Distance Measuring Equipment (DME/P) | 8/94 |
| 710-10 | 68.00 | 72.00 | Mark 2 Airborne ILS Receiver | 11/97 |
| 711-9 | 68.00 | 72.00 | Mark 2 Airborne VOR Receiver | 11/94 |
| 712-7 | 68.00 | 72.00 | Airborne ADF System | 7/92 |
| 714-6 | 68.00 | 72.00 | Mark 3 Airborne SELCAL System | 8/90 |
| 715-3 | 46.00 | 51.00 | Airborne Passenger Address | 7/84 |

FIG.101

|  |  |  |  |  |
|---|---|---|---|---|
|  |  |  | Amplifier |  |
| 716-10 | 68.00 | 72.00 | Airborne VHF Comm. Transceiver | 1/98 |
| 717-10 | 84.00 | 87.00 | Flight Data Acquisition and Recording System | 4/98 |
| 718-4 | 84.00 | 87.00 | Mark 3 Air Traffic Control Transponder (ATCRBS/MODE S) | 12/89 |
| 719-5 | 99.00 | 101.00 | Airborne HF/SSB System | 7/84 |
| 720-1 | 46.00 | 51.00 | Digital Frequency/Function Selection for Airborne Electronic Equipment | 7/80 |
| 722 | 46.00 | 51.00 | Projection Video System | 11/80 |
| 723-3 | 68.00 | 72.00 | Ground Proximity Warning System | 1/88 |
| 724-9 | 84.00 | 87.00 | Mark 2 Aircraft Communications Addressing and Reporting System (ACARS) | 9/98 |
| 724A* | 84.00 | 87.00 | Mark 2 Enhanced ACARS Avionics | 1/87 |
| 724B-3 | 68.00 | 72.00 | Aircraft Communications Addressing and Reporting System (ACARS) | 12/95 |
| 725-2 | 68.00 | 72.00 | Electronic Flight Instruments (EFI) | 11/84 |
| 726-1 | 68.00 | 72.00 | Flight Warning Computer System | 9/81 |
| 727-1 | 68.00 | 72.00 | Airborne Microwave Landing System | 8/87 |
| 728 | 46.00 | 51.00 | Avionics Refrigeration Cooling System (ARCS) | 10/79 |
| 729-1 | 68.00 | 72.00 | Analog and Discrete Data Converter System | 9/81 |
| 730-3* | 68.00 | 72.00 | Airborne Separation Assurance System | 1/82 |
| 731-3 | 46.00 | 51.00 | Electronic Chronometer | 11/98 |
| 732-1 | 46.00 | 51.00 | Mark 2 Airborne Passenger Audio Entertainment Tape Reproducer | 3/96 |
| 735-2 | 99.00 | 101.00 | Traffic Alert and Collision Avoidance System (TCAS) | 1/93 |
| 735A | 99.00 | 101.00 | Mark 2 Traffic Alert and Collision Avoidance System (TCAS) | 12/97 |
| 737-1 | 46.00 | 51.00 | On-Board Weight and Balance System | 3/88 |

FIG.10m

| | | | | |
|---|---|---|---|---|
| 738-1 | 84.00 | 87.00 | Air Data and Inertial Reference System (ADIRS) | 11/94 |
| 739-1 | 46.00 | 51.00 | Multi-Purpose Control and Display Unit | 6/90 |
| 739A-1 | 46.00 | 51.00 | Multi-Purpose Control and Display Unit | 12/98 |
| 740-1 | 46.00 | 51.00 | Multiple-Input Cockpit Printer | 6/88 |
| 741P1-9 | 99.00 | 101.00 | Aviation Satellite Communication System, Part 1, Aircraft Installation Provisions | 11/97 |
| 741P2-6 | 84.00 | 87.00 | Aviation Satellite Communication System, Part 2, System Design | 4/98 |
| 742 | 46.00 | 51.00 | Design Guidance for Windshear Warning and Guidance Equipment | 1/88 |
| 743 | 46.00 | 51.00 | Airborne Global Positioning System Receiver | 3/90 |
| 743A-3 | 68.00 | 72.00 | GNSS Sensor | 2/98 |
| 744 | 46.00 | 51.00 | Full-Format Printer | 12/90 |
| 744A-1 | 68.00 | 72.00 | Full-Format Printer with Graphics Capability | 3/94 |
| 745-2 | 68.00 | 72.00 | Automatic Dependent Surveillance | 6/93 |
| 746-4 | 84.00 | 87.00 | Cabin Communications System (CCS) | 4/96 |
| 747-2 | 68.00 | 72.00 | Flight Data Recorder | 1-99 |
| 748* | 68.00 | 72.00 | Communications Management Unit (CMU) | 1/93 |
| 750-2 | 68.00 | 72.00 | VHF Data Radio (VDR) | 12/97 |
| 751 | 46.00 | 51.00 | Gate-Aircraft Terminal Environment Link (Gatelink) - Aircraft Side | 1/94 |
| 752-1 | 46.00 | 51.00 | TFTS Airborne Radio Subsystem | 1/93 |
| 753-2 | 84.00 | 87.00 | HF Data Link System | 3/98 |
| 755-1 | 99.00 | 101.00 | Multi-Mode Receiver (MMR) - Digital | 2/98 |
| 756-1 | 68.00 | 72.00 | GNSS Navigation and Landing Unit (GNLU) | 7/98 |
| 757 | 46.00 | 51.00 | Cockpit Voice Recorder (CVR) | 12/93 |
| 758-1 | 84.00 | 87.00 | Communications Management Unit (CMU) Mark 2 | 2/98 |
| 760 | 68.00 | 72.00 | GNSS Navigation Unit (GNU) | 3/97 |
| 761-1 | 68.00 | 72.00 | Second Generation Aviation Satellite Communication | 1/99 |

FIG. 10 n

System, Aircraft Installation
Provisions

---

- "Dash number" following a document number indicates that all Supplements numbered 1 through the dash number are included within the document.

* Although still available from ARINC, this document is OBSOLETE, meaning the standard is no longer recommended for use or maintained current for new equipment designs. (The equipment designed to this category of AEEC standard has served the industry well. Equipment currently in use that complies with these standards should continue to be used in airline service.)

** Supplements can be ordered separately. The price for each one is $15.00 mailed within North America, and $17.00 outside North America.

*** Adopted by AEEC, but not yet available for publication. Call the Document Section for status of these documents.

---

For more information, contact:
Cheryl Hrisko
ch@arinc.com
410-266-4117
Fax: 410-266-2047

Home | Site Map | Search | Contact Us
Products & Services | News | Corporate Info
Employment | Industry Activities © 1999 ARINC Incorporated
Home > Industry Activities> Characteristics> 700 SERIES

AIRCRAFT DATA MANAGEMENT SYSTEM

CROSS-REFERENCE TO RELATED APPLICATIONS

This patent application relates to and claims priority to U.S. Provisional Patent Application Serial No. 60/103,823 that was filed on Oct. 9, 1998. The disclosure of Provisional Patent Application Ser. No. 60/103,823, as well as the disclosure of commonly owned U.S. Pat. No. 5,754,445 entitled "Load Distribution and Management System" by Jouper, et al., is incorporated herein by reference in its entirety.

BACKGROUND OF THE INVENTION

1. Field of the Invention

This invention relates to a system for managing the distribution of power and data to a plurality of users, for example, passengers on-board a commercial aircraft. Preferably such a system includes, an integrated seat box (ISB) located proximate to a seat group that contains plug-in modules to support desired functions. The function modules may support, without limitation, an in-seat power supply, video, telephony, audio, noise cancellation and data transfer.

2. Description of Related Art

Passengers on extended travel, such as a long distance commercial aircraft flight, seek an assortment of in-flight diversions to make travel time more enjoyable and/or productive. Pre-programmed audio tracks are presently available to commercial aircraft passengers. In some audio system embodiments, an audio playback apparatus housed on-Docket board the aircraft reproduces simultaneously multiple audio programs from optical compact discs (CDs) and/or magnetic audio tapes. The multiple audio programs are transmitted to individual seat locations where a desired audio channel may be selected by the passenger for individual listening.

Some aircraft also provide a single video channel, such as an in-flight movie. The audio portion of the movie is usually transmitted along with the other audio programs that may be selected by the individual user. The video signal is separately transmitted to video transmitters strategically positioned throughout the aircraft for viewing.

Multi-channel video is presently available in premium flight classes on certain aircraft. Multi-channel video is provided by a method analogous to multi-channel audio. A plurality of video programs embedded in either a CD or magnetic audio tape are simultaneously played by a video transmitter and delivered to individual seat locations. The passenger may then select a desired video channel for viewing.

For both video and audio, on-board data servers can receive multi-megabit per second downloads of video and entertainment data through network connections while the aircraft is still at the jetway. This capability enables the storage and subsequent retransmission of near real time audio and video broadcasts. An on-aircraft data server stores and compresses digital audio and video streams, retrieves the video and audio data, merges it into a continuous stream, and delivers it seamlessly to the in-flight distribution network. Operating much like a conventional local area network (LAN), the multiplexed audio, video, and other digital data are distributed over a multiplexed data link (MUX) in digital format. These links may be comprised of conventional wire or of a single strand of fiber optic material. Data transmission of video data in MPEG (Moving Picture Expert Group, a standard for digital audio and video compression) format is typically delivered in the 1.2–4.0 Megabit per second range. Typical in-flight entertainment systems take advantage of data compression both at the point of storage and during transmission. Fiber optic communication, and high speed data servers are routinely configured to provide multiple channels of video and audio programming to up to 300 passengers at a time.

In addition to entertainment, some passengers elect to increase productivity by working on the aircraft. These passengers typically possess a small personal computer, commonly referred to as a notebook or laptop computer. These personal computers may be battery operated, however, the battery operating life is somewhat limited, typically on the order of 1–5 hours of continuous service. Many types of personal computers are equipped with an adapter that converts a 15 volts dc power supply to a form useful to power the computer. As disclosed in U.S. Pat. No. 5,754,445, an electric power supply may be delivered to the individual seats of a passenger aircraft and, provided that sufficient power is available for use by that particular passenger, allow that passenger to work with his/her personal computer using the electric power of the aircraft.

In addition, passengers may utilize telephony on-board an aircraft, either to communicate with family or office or for the receipt or sending of facsimile messages. Through the use of a modem, personal computer users may also utilize the telephony system to receive and send email through their personal computers. Many aircraft already provide a telephony system whereby an individual handset is located with each group of seats and an individual caller may contact ground-based telephone numbers via one of a number of commercial telephony satellite systems. Typically, such telephony systems are separate from and utilize components distinct from the audio and video systems on the aircraft.

As the passenger electronics requirements become more varied and sophisticated, comparable better hardware to support such individual applications is required. This may greatly increase the complexity of circuitry delivered to individual passenger seats. For safety purposes, seats containing electrical systems must be certified by appropriate governmental agencies. Further, any changes in electrical systems provided to these seats may require additional certifications. Still further, the area available both within the seat structure and under the seats of a passenger aircraft is quite limited and preferably must remain available for the stowing of carry-on luggage.

There remains, therefore, a need for an aircraft data management system with sufficient flexibility to support and integrate the entertainment, power and data needs of commercial aircraft passengers, both for the present and the future.

BRIEF SUMMARY OF THE INVENTION

Accordingly, one aspect of the present invention is directed to a data management system for supplying data to selected ones of identifiable seats comprising:

a) a plurality of data sources;

b) at least one power source;

c) a network controller capable of managing the plurality of data sources;

d) a seat-to-seat cable having therein data communication lines and power supply lines whereby both data from the plurality of data sources and power from the at least one power source are routed to seats on the aircraft.

One embodiment of this aspect includes an integrated seat box that is disposed proximate to a group of identifiable seats. This integrated seat box converts the data and/or the power to a form useable by a requesting passenger. A number of independently removable function modules are contained within the integrated seat box. Exemplary functions supported by these modules include in seat power supply, data network interface, audio, video, noise cancellation, telephony and the like as well as combinations thereof.

Another aspect of the present invention is directed to a method for the operation of a data management system including a passenger having the ability to select one or more of multiple options. The passenger communicates with the network controller via a network interface module in the integrated seat box disposed proximate the passenger.

Both the system and the method for operation of the system are particularly suitable for use on passenger aircraft.

IN THE DRAWINGS

Figure 3:
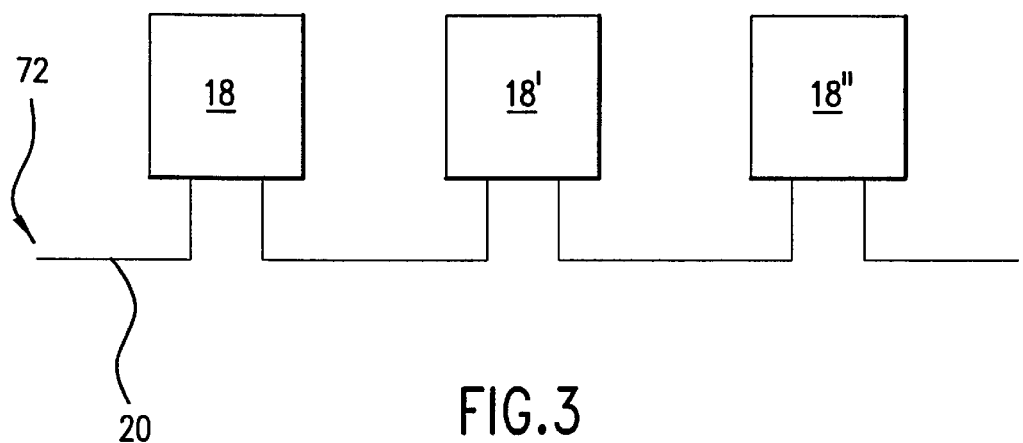

FIG. 3 schematically illustrates the interconnection of integrated seat boxes located within a column of seats.

Figure 4:
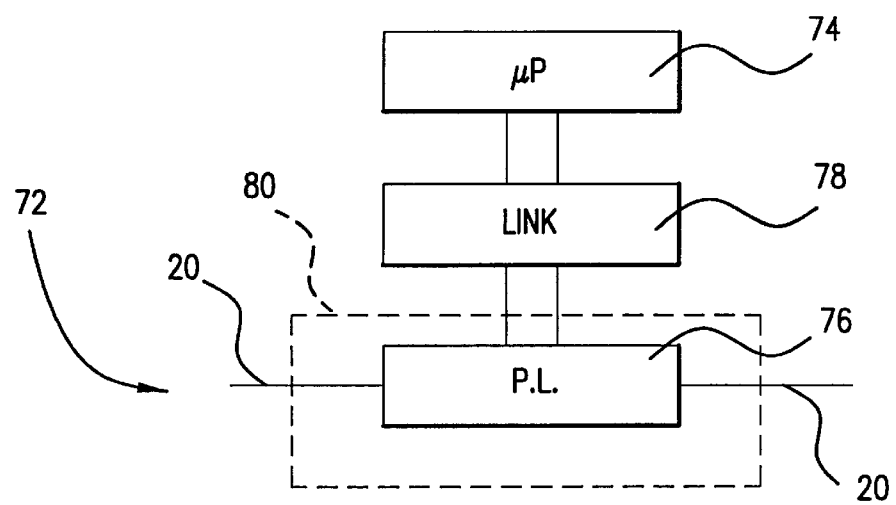

FIG. 4 illustrates one embodiment of a fault-tolerant architecture for an integrated seat box.

Figure 5:
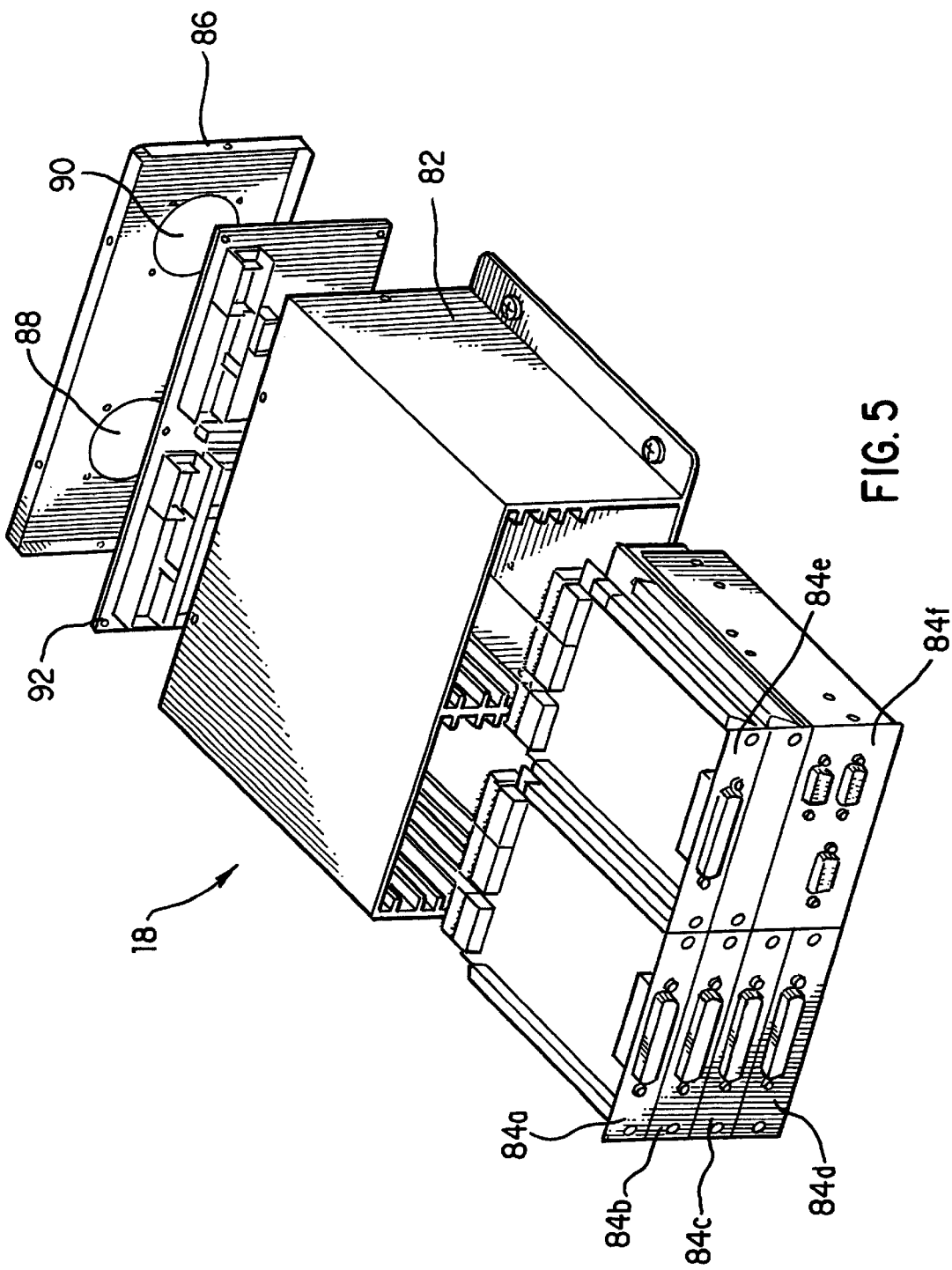

FIG. 5 illustrates an integrated seat box in exploded perspective.

Figure 6A:
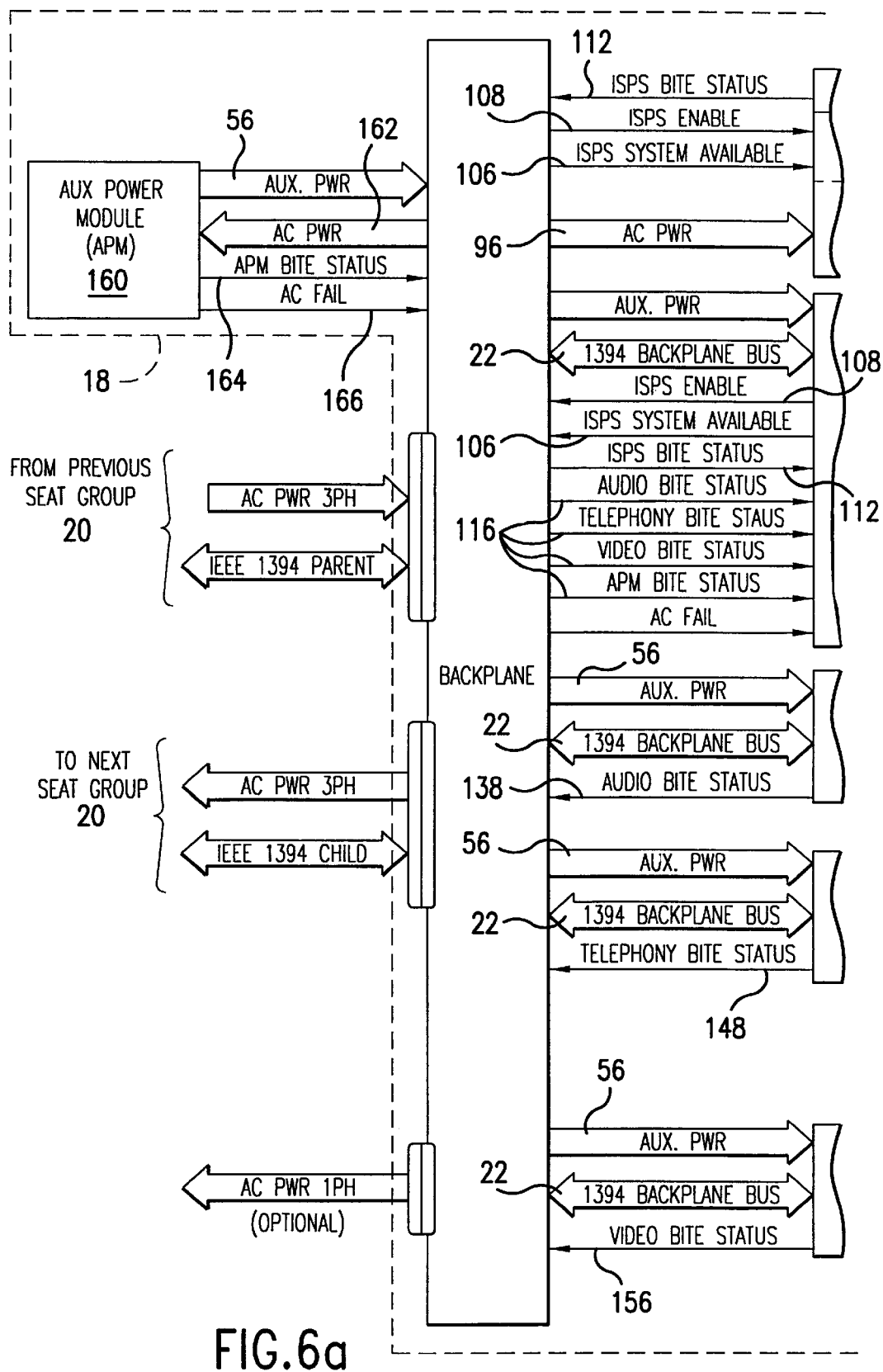
Figure 6B:
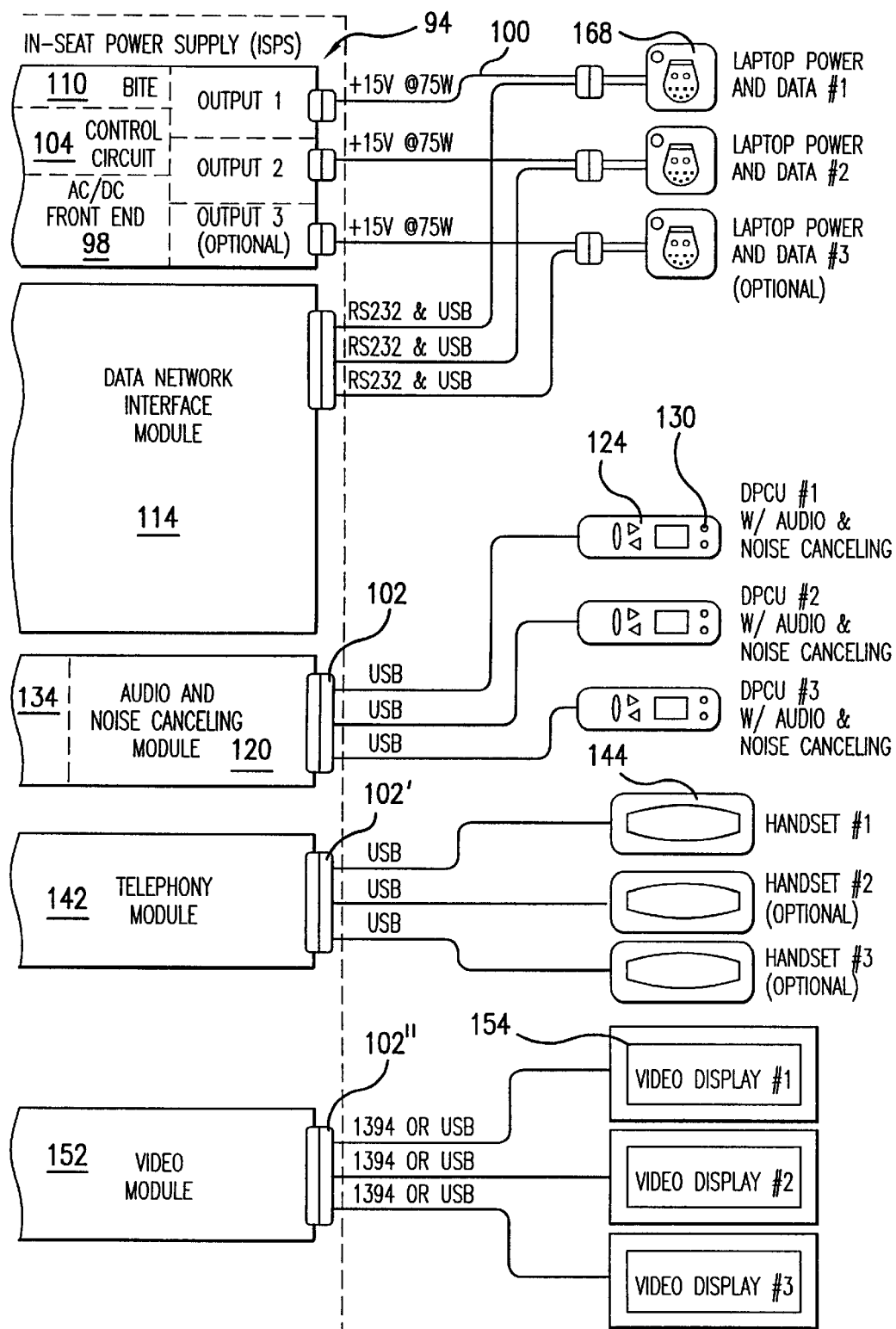

FiG 6 schematically illustrates a number of function modules that that may be utilized with the integrated seat box.

Figure 7:
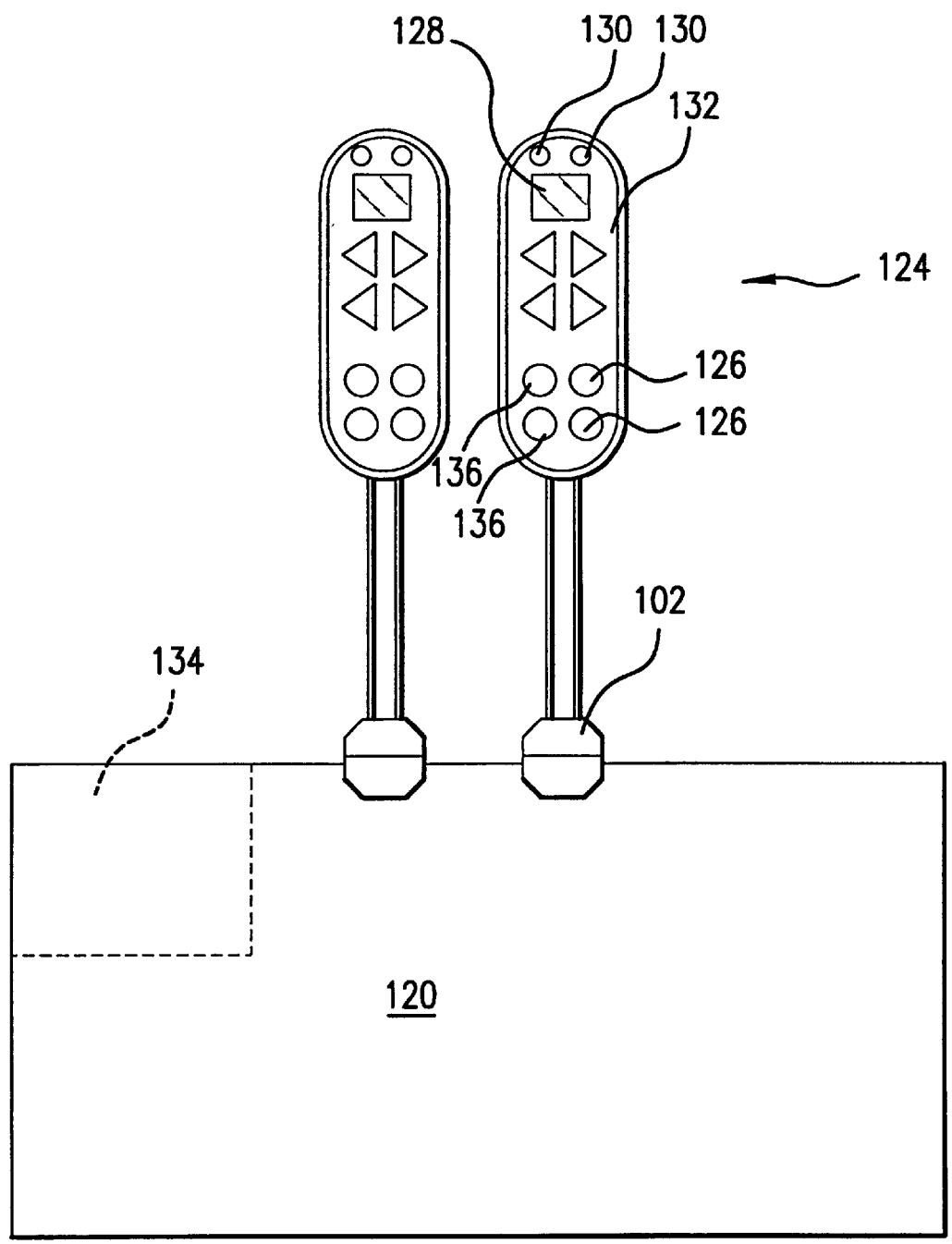

FIG. 7 illustrates a digital passenger control unit used to interface with an audio function module.

Figure 8:
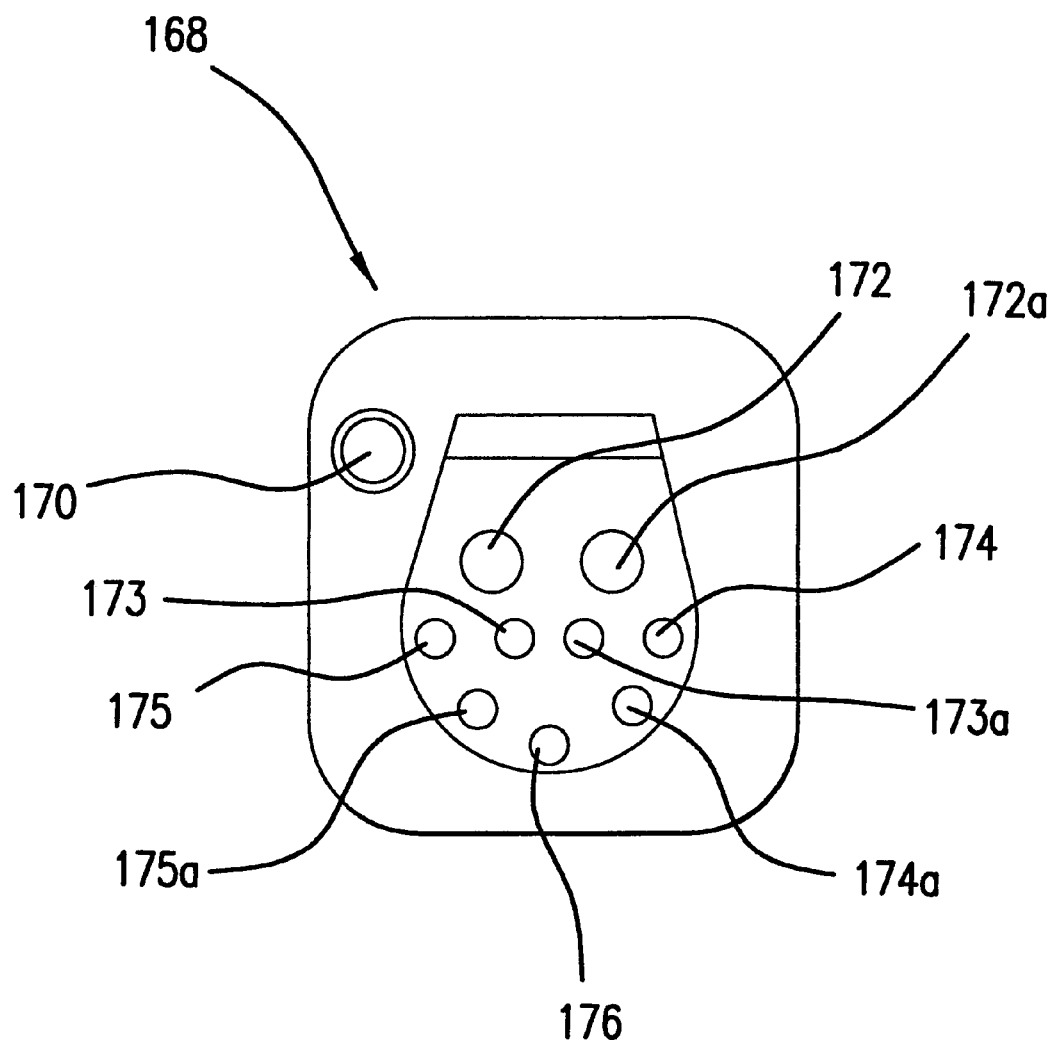

FIG. 8 is a front planar view of the passenger side of an outlet used to communicate with the function modules.

Figure 9A:
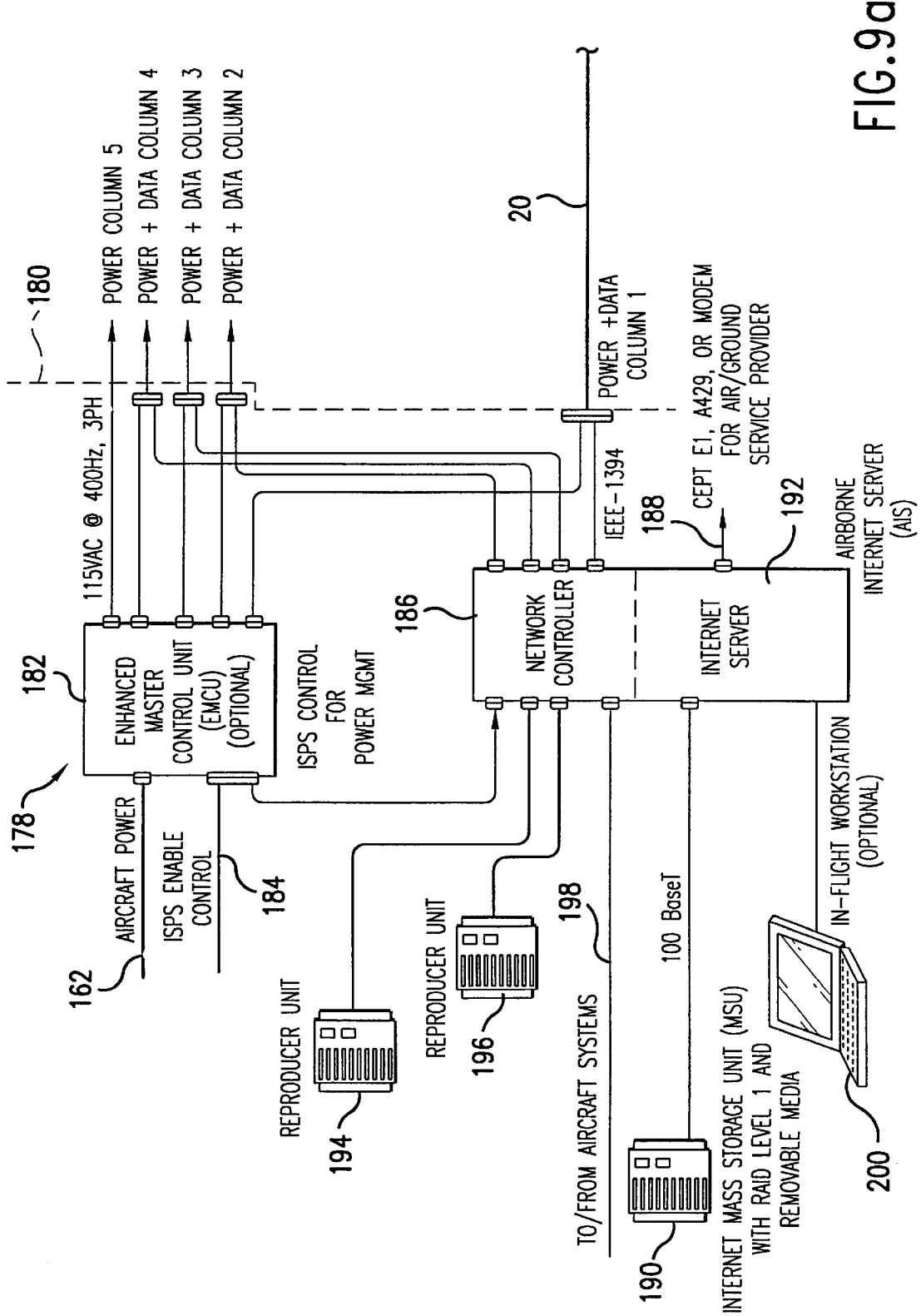
Figure 9B:
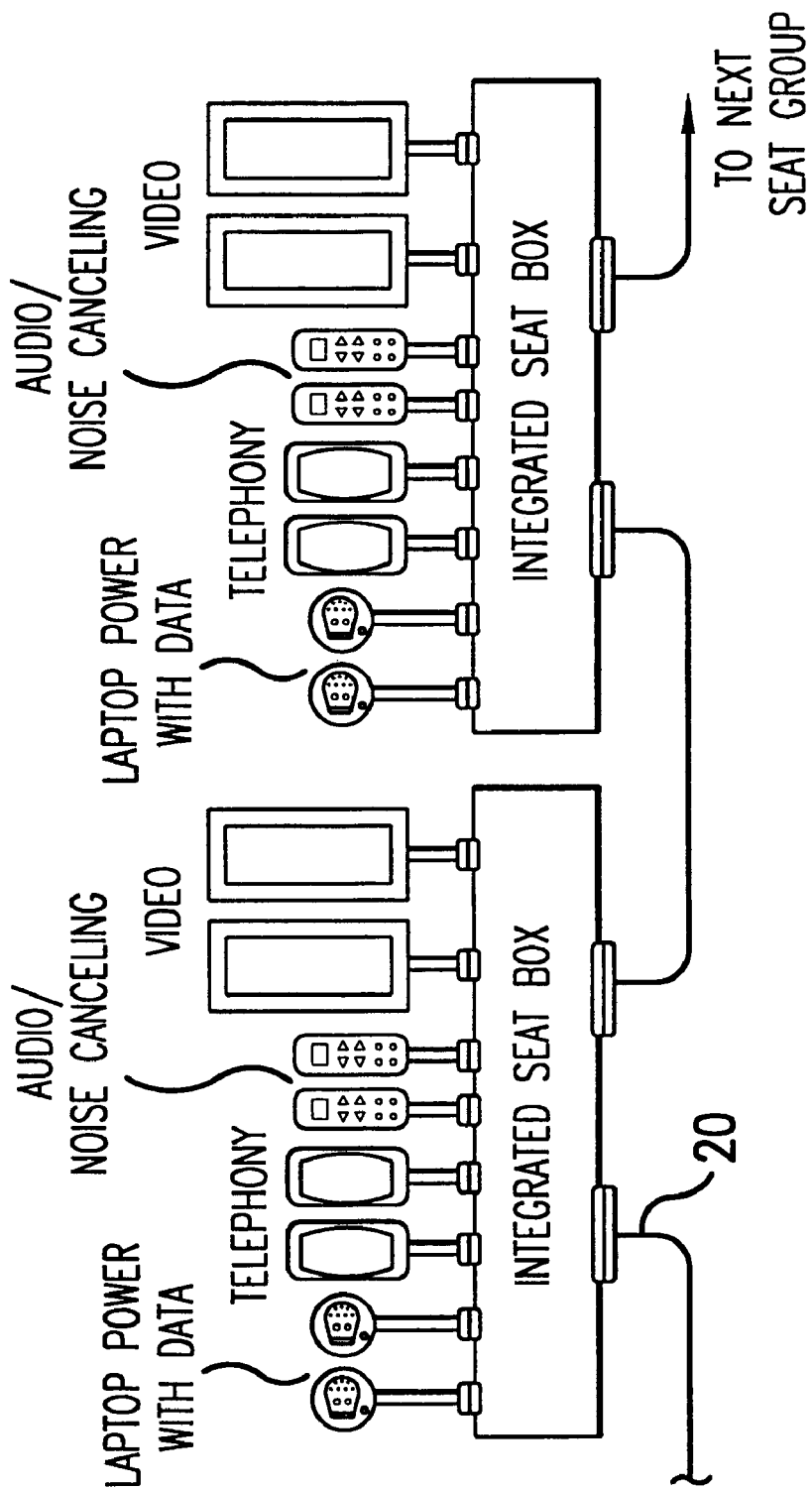

FIG. 9 schematically illustrates the front end portion of the aircraft data management system of the invention.

FIGS. 10a–10o illustrate ARINC standards, as known from prior art.

Figure 11A:
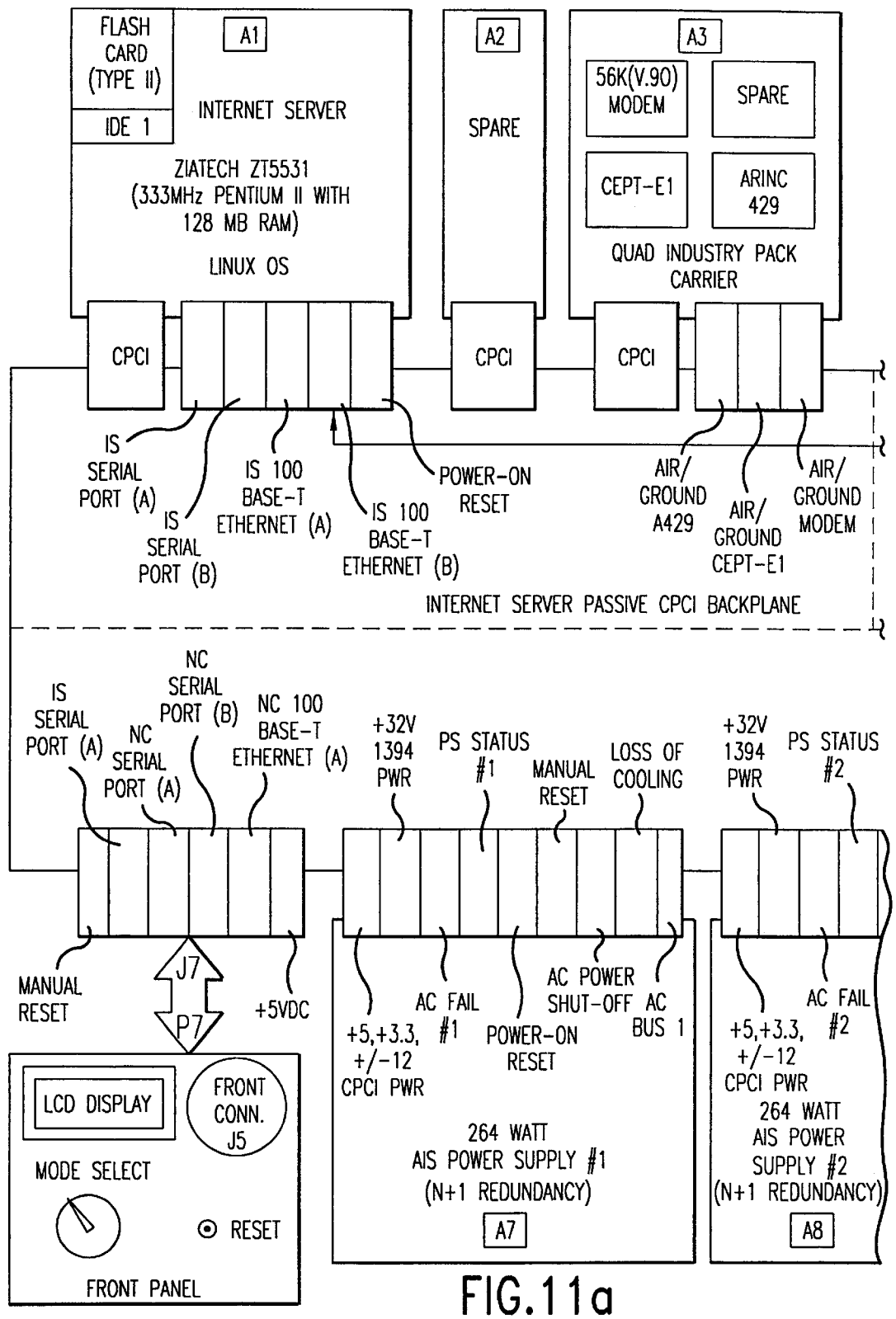
Figure 11B:
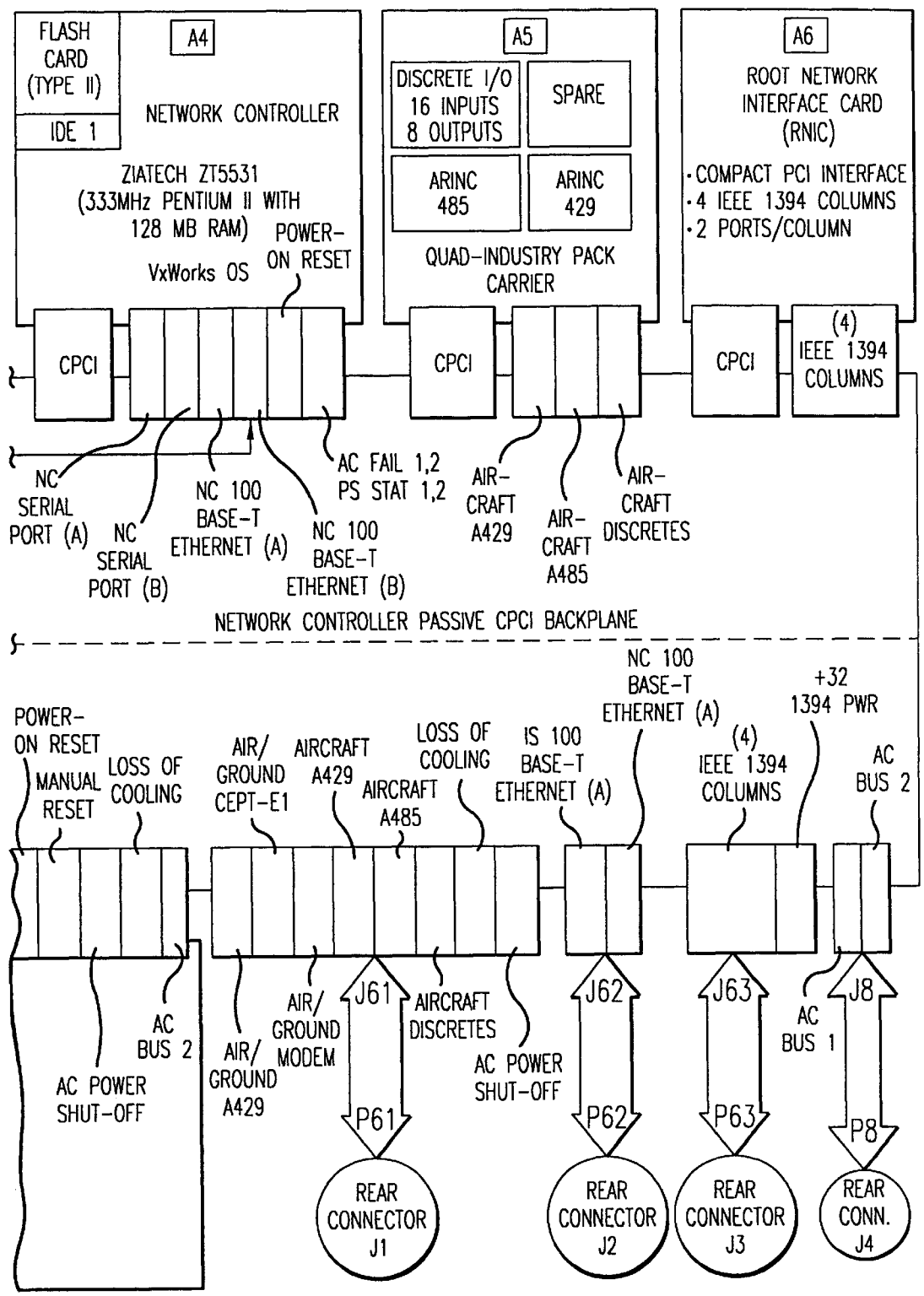

FIG. 11 schematically illustrates an airborne Internet server in accordance with the invention.

Figure 12:
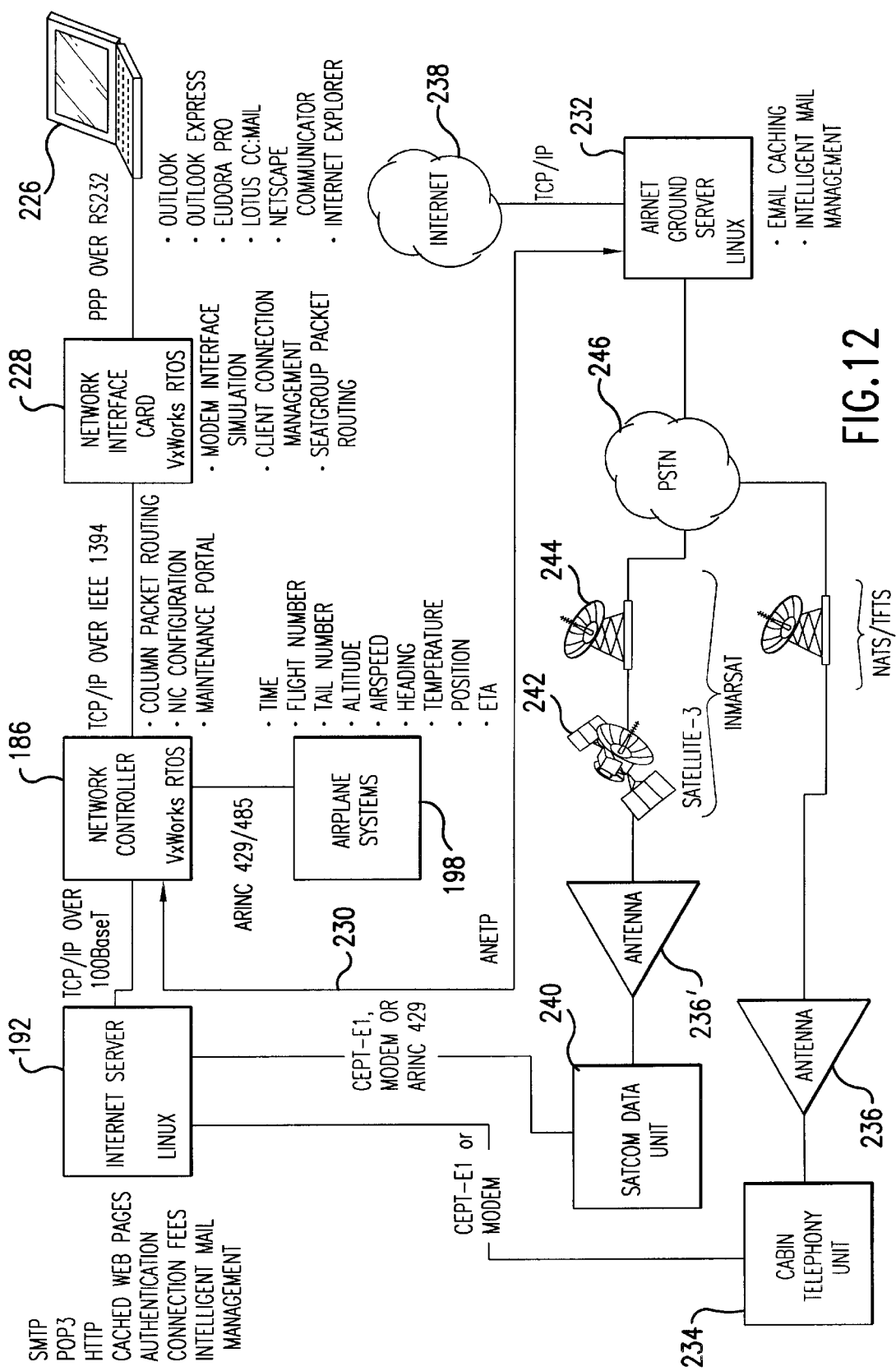

FIG. 12 graphically illustrates communication between an aircraft and a ground-based system.

DETAILED DESCRIPTION

Figure 1:
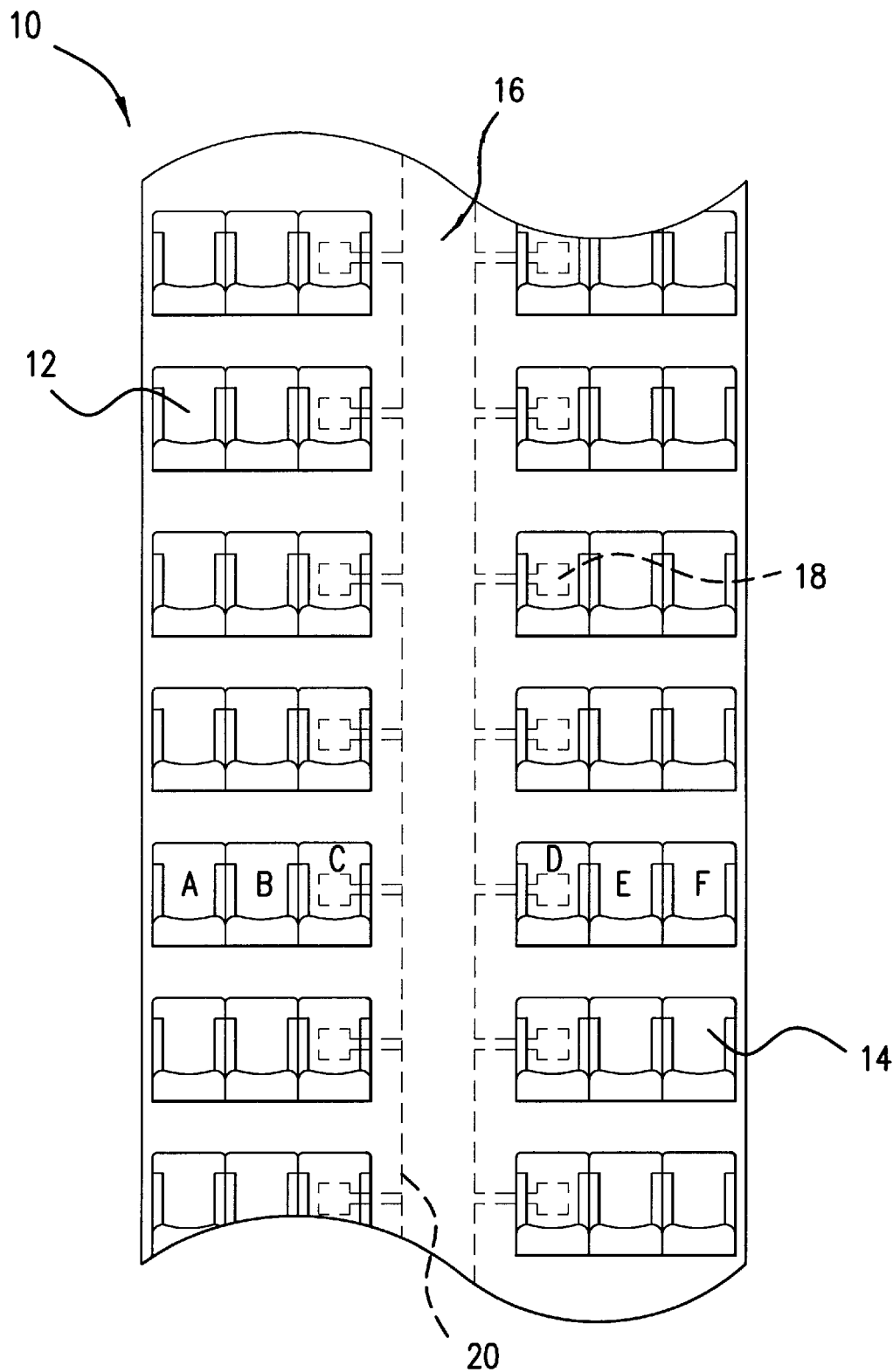
FIG. 1 illustrates in top planar view a portion of an aircraft fuselage adapted to use the data management system the present invention.

FIG. 1 illustrates in top planar view a portion of an aircraft fuselage 10 adapted to use the data management system of the invention. Contained within fuselage 10 is a first column of seat groups 12 and a second column of seat groups 14. The respective columns of seat groups are separated by a cabin walkway 16. As illustrated, each member of the first column of seat groups 12 is a set of three seats (A,B,C) and each member of the second column of seat groups 14 is a set of three seats (D,E,F). As a result, each individual seat is identifiable, such as by a combination of a row number and position letter. While this seat configuration is typical for a narrow body commercial aircraft such as a Being 727 or 737 series jet, other seat configurations are equally amenable to the present invention, including wide body jets having multiple parallel running cabin walkways separating additional columns of seat groups.

Located proximate to each set of seats is an integrated seat box 18 that is capable of converting at least one of the data and the power to a form useful to a passenger occupying one of the identifiable seats. Preferably, this ISB 18 is located under aisle seats C and D, or whatever seats are located adjacent to the cabin walkway 16 for a particular aircraft configuration. Alternatively, the ISB may be located above the seats in the overhead storage compartment, or under the aircraft floor, or within a hollow portion of a seat arm rest, or any other convenient location. The ISB may utilize flexible circuit boards and/or integrated semiconductor circuitry.

A seat-to-seat cable 20 delivers both power and data to the integrated seat boxes 18 from a plurality of data sources and at least one power source. In addition, the seat-to-seat cable 20 enables communication between passengers located in the aircraft seats and a head end of the aircraft data management system which includes a network controller that is capable of managing the plurality of data sources and is described in more detail hereinbelow.

Figure 2:
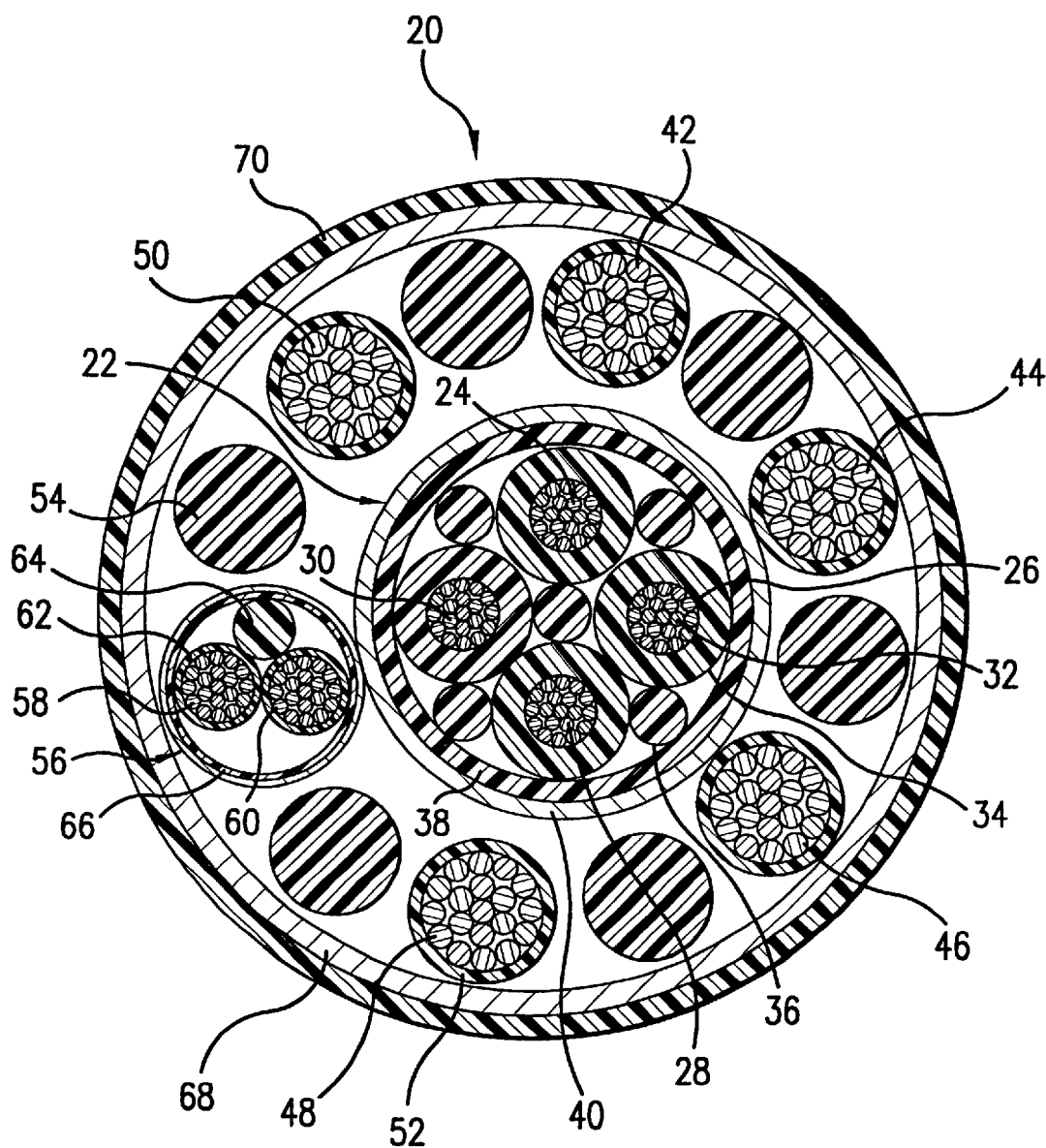
FIG. 2 illustrates a seat-to-seat cable in cross-sectional representation.

FIG. 2 illustrates in cross-sectional representation a first preferred embodiment of the seat-to-seat cable 20. The seat-to-seat cable contains both data communication lines and power supply lines and transmits data and power from data sources and power sources to selected identifiable seats by way of the network controller. Among the requirements of the seat-to-seat cable 20 are that it provide a sufficiently high band width to support the various functions requested by the passenger. It should support high-speed data distribution to provide real time data delivery for audio and video and telephony.

Running through a central portion of the seat-to-seat cable 20 is, preferably, an IEEE-1394 data bus 22, such as a Quad Pack, although other wide bandwidth communication cables may also be used. The IEEE-1394 data bus 22 has a plurality of high speed communication lines 24,26,28,30. These high speed communication lines are preferably 20 AWG (American Wire Gage, nominal diameter of 0.038 inch) copper wires 32 that are each surrounded by a dielectric, typically plastic, insulating jacket 34. While four high speed communication lines are illustrated in FIG. 2 and four lines are presently preferred, it is within the scope of the invention for either more or less high speed communication lines to be disposed within the seat-to-seat cable. Preferably, the high speed communication lines 24,26,28,30 support at least 400 megabytes per second (Mbps)of data. Higher speed communication lines, such as 800, 1600 or 3200 or higher Mbps communication lines, may be preferred for certain applications. Typically, the four high speed communication lines are twisted together to reduce common mode noise, although other communication line configurations effective for high speed communication may also be utilized.

Dielectric fillers 36, typically plastic wires, are disposed between the high speed communication lines 24,26,28,30 to maintain proper spacing. The IEEE-1394 data bus 22 is encased in a flexible dielectric 38, such as a polymer. Surrounding the flexible dielectric 38 is a cable shield 40 formed from an electrically conductive material such as aluminum. The cable shield 40 electrically isolates the high speed communication lines 24,26,28,30 from five power lines 42,44,46,48,50. The power lines provide an operating voltage to the integrated seat boxes. Typically, the operating voltage is 3 phase, 115 volts AC at 400 Hz. The three phases are conducted via power lines 42,44,46 with power line 48 being neutral and power line 50 a ground.

Preferably, power lines 42,44,46,48,50 are each formed from 16 AWG copper wire (nominal diameter 0.054 inch)

and are insulated with a flexible dielectric coating 52, typically a plastic jacket. Dielectric spacers 54, typically plastic wires, are disposed between the power lines for alignment.

Optionally, auxiliary power for the data bus is provided via auxiliary power line 56. The auxiliary power line is preferably a twisted pair of 20 AWG copper wires comprising a power line 58 and a ground line 60. The power line 58 and the ground line 60 are encased in a flexible dielectric 62, such as a plastic jacket for electrical isolation. Dielectric spacer 64 may be provided for alignment. Surrounding the power line 58 and ground line 60, and optional dielectric spacer 64 is an auxiliary power jacket 66. The auxiliary power jacket may comprise a flexible dielectric inner layer surrounded by a metallic outer layer.

The auxiliary power line 56 transmits a voltage of between 8 volts dc and 40 volts dc with about 32 volts dc being preferred.

An overall EMI (electromagnetic interference) shield 68, formed from a metal, such as aluminum or an aluminum alloy surrounds the high speed communication lines, power lines and auxiliary power lines, Surrounding the overall EMI shield is a flexible dielectric, such as a polymer jacket 70, to provide abrasion resistance.

FIG. 3 illustrates how the seat-to-seat cable 20 interconnects the integrated seat boxes located along a column of seat groups. A daisy chain configuration is preferred with power and data being transmitted from a head end 72 down to a forward integrated seat box 18 and then sequentially down the length of a seat column through ISB 18' and 18". Data is two-way and is also transmitted up the daisy chain as well. Preferably, the network supports daisy chain wiring with a minimum of 30 hops per column.

The network supports a fault-tolerant architecture where a local fault in any one integrated seat box or any one data network interface module contained within the integrated seat box, including the loss of power, does not cause the loss of service to either adjacent or following integrated seat boxes or data network interface modules. Referring to FIG. 4, one fault-tolerant architecture for the integrated seat boxes includes a microprocessor 74 for carrying out the functions of the data network interface module. Seat-to-seat cable 20 provides auxiliary dc power from the network controller (via power line 58 in FIG. 2) that is used to power up a physical layer 76 of an IEEE-1394 interface. The remainder of the module, including microprocessor 74 and link 78 is powered by a local power supply that converts power from the 115 volt AC power (via power lines 42,44,46 in FIG. 2) in the seat-to-seat cable 20 to a useable form. Galvanic isolation, as symbolized by broken line 80, between the two grounds (50,60 in FIG. 2) of these different power sources enables the physical layer 76 to continue operation even if microprocessor 74 or the local power supply should fail. As long as the physical layer is operational, data will be sent to the next seat box in the chain.

FIG. 5 illustrates an integrated seat box 18 in exploded perspective. A chassis 82 provides environmental protection for a plurality of independently removable function modules 84a–84f and electrically isolates the function modules from electrical noise within the passenger cabin of the aircraft. Typically, the chassis is formed from a metal, such as aluminum or an aluminum alloy, and is electrically grounded to the aircraft by a ground line of the seat-to-seat cable. For safety, a redundant ground is preferably provided by physical connection to the aircraft. This physical connection may be made by bolting the chassis 82 to a metallic seat frame or by grounding straps to the aircraft body if the seat frame is a nonconductive composite as found in the Boeing 777 aircraft.

Six function modules 84a–84f is exemplary and not intended to be limiting. Both more and less function modules are within the scope of the present invention.

A back-plate 86 forms a portion of the chassis. Connectors located on a back plane 92 receive the seat-to-seat cable 20 as it enters the integrated seat box 18 through ingress aperture 88 and exits through egress aperture 90. The back plane 92 physically supports the function modules 84a–84f and distributes the power and communication signals from the seat-to-seat cable to the various function modules.

Each function module 84a–84f is independently slidable into the chassis 82 and may be varied depending on the requirements of the aircraft. Individual modules may also be removed to change functionality or to replace defective ones.

FIG. 6 schematically illustrates a number of function modules that that may be utilized with each integrated seat box 18. Preferred examples of these modules include the following:

ISPS Module

The in-seat power supply (ISPS) module 94 is described in detail in the afore noted U.S. Pat. No. 5,754,445. The ISPS module 94 receives nominal 115 volt, 3 cycle AC power 96 from the seat-to-seat cable 20. A power converter 98 converts the AC power 96 into a form useable by personal computers, exemplary is 11–16 volts dc with 15 volts dc, 75 watts being preferred. The converted dc power 100 is provided to a passenger outlet interface 168 located at each seat location.

The AC power conducted through seat-to-seat cable 20 is utilized in critical aircraft functions such as navigation and control. A certain minimum threshold of power must remain available for these critical functions. A control circuit 104 is in communication with a master control unit (illustrated in FIG. 9) in the head end that determines if the satisfaction of another passenger's personal electric power needs causes the aircraft power to drop below the minimum threshold power requirement. The master control unit informs the in-seat power supply 94 of the in-seat power availability via the ISPS enable signal 108 and the ISPS system available signal 106. These signals 108,106 are communicated to the ISPS via a data network interface module 114. ISPS enable signal 108 is used to disable the system in situations where the entire system must be kept off. For example, the ISPS may not be enabled if the aircraft is at an elevation of less than 10,000 feet or if the flight crew manually disables the system. ISPS system available signal 106 is used to control the power management feature of the system. If, for example, the minimum threshold power demand has been met, this signal will be asserted to prevent any more outlets from providing power until additional power becomes available, typically by other passengers terminating their personal electric power demand.

A BITE (built-in test equipment) circuit 110 monitors the status of the ISPS module 94 and transmits ISPS BITE status 112 information to the data network interface module 114 for transmission to the head end. This enables identification of defective modules for removal from service as well as replacement or repair.

Data Network Module

The data network interface module 114 simulates a modem interface between a passenger's personal computer (laptop, notebook, and the like) and the data management system. The data network interface module 114 transfers data from the head end to the passenger's personal computer or other data recipient via the IEEE-1394 data bus 22, or equivalent.

The data network interface module 114 assigns a seat group routing tag to the data transmitted and determines if the seat group routing tag corresponding to a seat member supported by the instant integrated seat box 18 has been received and, if so, provides the data to passenger outlet interface 168. The data network interface module includes a network interface card (illustrated in FIG. 12) that utilizes a real time operating system (RTOS) for real time transfer of data. One suitable RTOS is VxWORKs, manufactured by Wind River Systems of Alameda, Calif.

The data ports of the passenger outlet interface 168 are typically an RS 232 serial port for low speed data transmission and/or a Universal Serial Bus (USB) for high speed data transmission. Although other computer standards for data transfer may be utilized as well.

The data network interface module 114 supports two way communication and transmits data from the individual passenger seat locations back to the head end controller that may contain an airborne internet server. The data contains a seat group routing tag to be directed to the proper location, such as another passenger (an on-aircraft intranet), video controller (to select and watch a desired video) or off-aircraft (to receive email from the passenger's home or business server).

The data network interface module 114 receives BITE status 116 from the other function modules and transmits the BITE status information to the head end via the IEEE-1394 data bus 22 so that defective modules may be identified and replaced or disabled.

Audio and Noise Cancellation Module

An audio module 120 receives multiple audio tracks through IEEE-1394 data bus 22, or equivalent, and power is obtained from auxiliary power line 56. The audio tracks are provided to connector 102, that is typically a Universal Serial Bus. A passenger operated digital passenger control unit (DPCU) 124 may be utilized to select the desired audio track and individual passenger headsets utilized to listen to the selected audio track.

Referring to FIG. 7, the DPCU 124 enables the passenger to select between audio and video modes, when applicable, utilizing audio/video toggle switch 126. A channel select display 128 indicates whether the DPCU is in video or audio mode and also the last user setting. Preferably the channel select display 128 is in the form of a backlit liquid crystal display (LCD) with a back lighting level that automatically adjusts for the ambient lighting conditions. If there is no activity with the DPCU for a fixed period of time, such as sixty seconds, it will automatically dim the display. The airlines have the capability, through the head end controller to select which audio or video program will play on a particular channel and also to set a default volume level.

The DPCU interfaces with the audio module through connector 102 and with a passenger's headset through either a single stereo (i.e. ⅛ inch diameter) headset plug (not shown) or dual monaural plugs 130 having standardized spacing such as 0.50 inch spacing or 0.531 inch spacing.

The covering 132 of the DPCU 124 is typically plastic in the form of a customized overlay that may be selected to be a particular color and human interface design dependent on the airline to facilitate a high degree of airline customization without excessive additional cost.

A noise cancellation module 134, described below, may be a component of the audio module 120 or constitute a separate module within the integrated seat box. If a noise cancellation module is present, the DPCU 124 may include a passenger controlled noise cancellation on/off toggle switch 136.

Referring back to FIG. 6, outlet 102 may also receive data from the passenger through a personal microphone connected through DPCU 124 headphone jack 130. The data is transmitted back to the head end and directed to a proper location by a seat group routing tag. The audio data may be directed to a flight attendant to request a service or transmitted off-aircraft as audio data.

As with the preceding modules, the audio module 120 transmits BITE status information 138 through the IEEE 1394 data bus 22, or equivalent, back to the data network interface module 114 and then on to the head end so that defective modules may be replaced or disabled.

The audio module 120 supports a minimum of 24 discrete audio channels having a minimum of 8 stereo selections, utilizing 16 channels, and 8 monaural selections. The systems provides a 20 Hz to 20 KHz dynamic range from the audio source to a headset plug 130 for providing "CD quality" audio.

The noise cancellation module 134 is compatible with noise canceling headsets designed for this system. Ambient noise is transmitted to the noise cancellation module by microphones in the headset. The noise cancellation module then generates "white noise" of a frequency and pitch effective to cancel the ambient aircraft noise. This white noise is transmitted through connector 102 to individual passenger's headsets. The headsets have an impedance compliant with standard aircraft headsets, such as 300 ohms.

Electronics to support noise cancellation have been described in U.S. Pat. Nos. 5,440,642 and 5,481,615, both to Noise Cancellation Technologies, Inc. and both incorporated by reference in the entirety herein. The noise cancellation features are designed to interface inline with the audio system. The noise cancellation feature will generally be passenger selectable on or off with the on position being a default. However, noise cancellation will generally be disabled when the flight crew is making an announcement.

Telephony Module.

Telephony module 142 receives power from the auxiliary power line 56 and transmits telecommunication in the form of data through the IEEE-1394 data bus 22, or equivalent. The system supports a personal computer modem at rates of up to 56 Kbps to provide high speed access to on-aircraft services such as an intranet.

In a first telephony embodiment, there is a telephone handset 144 interfacing with the telephony module 142 at each seat group, visually appearing similar to the telephony system now installed on most aircraft.

In a second telephony embodiment, the telephone handset 144 communicates through the data network interface module 114 over a universal serial bus via connector 102'. The telephony signal processing may either be handled by the data network interface module, if adequate processing power is available, or it may be transmitted to the separate telephony module 142. This embodiment supports portable telephones that are not permanently affixed to each group of seats. The flight crew may store a few telephones that would be available on request of the passenger or these could be mounted in a central location for passengers to pick up and bring to their seats.

As an alternative to this second embodiment, a passenger could utilize a personally owned cellular telephone interfaced with connector 102' utilizing a suitable adapter. Since the conventional use of cellular telephones on an aircraft may interfere with other aircraft systems, the adapter may include a cradle that deactivates the cellular telephone antenna and transmits the data via the adapter in a suitable format such as USB to the data network interface module 114.

In a third telephony embodiment, the telephone functionality is added as part of the audio system. In this embodiment, the audio headset would include a microphone. The DPCU 124 would support selection of numbers for dialing and communication by means of headphones and microphone. By going through the audio module, the noise cancellation module 134 may be utilized enhancing telephone communication.

Telephony module 142 includes telephony BITE status information 148 that is transmitted to the head end via the data network interface module 114 to enable identification of defective modules.

Video Module

A video module 152 receives power from auxiliary power line 56 and data from IEEE-1394 data bus 22, or equivalent. The video module interfaces with a video display panel 154 via an IEEE 1394 interface or a Universal Serial Bus through connector 102". Video output may be displayed on the video display panel 154 mounted in the aircraft. Alternatively, the video data may be routed via the data network interface module 114 to provide this video to the passenger's personal computer for viewing on the computer monitor.

Video module 152 also transmits data back to the head end via data network interface module 114 enabling the passenger to select a desired video and the desired starting time (video on demand) or to select one of a number of videos that begin at predetermined starting times (video partially on demand). Selections are inputted through the DPCU 124. It is anticipated the system will provide passengers with a minimum of 12 video channels. Each video channel will have a minimum of 2 stereo audio channels to support dual language audio and at least three channels will support trilingual audio tracks. The audio tracks will support noise cancellation technology as described above.

Video module BITE status information 156 is transmitted from the video module 152 to the head end via the data network interface module 114 to enable identification of defective modules.

Auxiliary Power Module

Auxiliary power module 160 converts aircraft power 162, 115 volts AC, 400 Hz, to dc power required for auxiliary power line 56. Any suitable power converter may be utilized.

Auxiliary power module 160 BITE status information 164 is transmitted to the head end via the data network interface module 114 to enable identification of defective modules. The AC fail signal 166 is transmitted to the data network interface 114 to warn the system that AC power has failed and DC power will be gone shortly.

FIG. 8 illustrates an exemplary passenger front view of the outlets previously described for passenger connection, by means of a cable forming an interface between the passenger's personal computer and the passenger outlet interface 168, with the ISPS and the data network interface module. Alternative configurations of plugs, pins and jacks may provide equally functional.

Passenger outlet interface 168 includes an enable light 170 that is electrically interconnected to the control circuit of the in-seat power supply module. Any suitable enable signal may be utilized. For example, enable light 170 may glow green when power is available and be off when power is not available. Alternatively, enable light 170 may glow red when power is not available or to indicate a hardware fault with either the ISPS module or the integrated seat box.

Power plugs 172 enable the passenger to access power for personal use when enable light 170 indicates that such power is available. Data plugs 174, 175 access the RS 232 ports and Universal Serial Buses contained within the integrated seat box and electrically interconnect to one or more passenger operated devices, such as personal computer, telephone handset or an airline provided tablet that allows passengers to utilize many of the system features such as Internet access, email and video and audio programming.

One exemplary pin sequence utilizes two plugs 172, 172*a* for supplying power and two plugs 173, 173*a* to enable power when available. Two plugs 174, 174*a* are utilized for low speed data transmission via the RS-232 port and two lugs 175, 175*a* are utilized for high speed data transmission via the USB. Plug 176 is shared for low and high speed data transmission as a common ground.

FIG. 9 schematically illustrates the head-end 178 or front end portion of the aircraft data management system of he invention and is separated from the remainder of the system by broken line 180. For reference to earlier resented figures, a portion of the seat-to-seat cable 20 is illustrated. Aircraft power 162 that may be generated during rotation of the turbine engines of the aircraft is delivered to a master control unit 182. The master control unit 182 conducts the aircraft power to the power lines of the seat-to-seat cable 20 if ISPS enable control circuit 184 indicates that power is available for passenger use and may be safely provided. For example, the use of on-board electronic devices is usually prohibited when the aircraft is at an elevation of below 10,000 feet.

A network controller 186 has a software subsystem programmed to control multiple streams of data, recognize a seat group routing tag applied to that data, and deliver the data through IEEE-1394 data bus, or equivalent, to the appropriate passenger. The network controller 186 is provided with a sequence of seat group routing tags corresponding to the seat configuration of the aircraft. If the seat configuration is changed, network controller 186 is reprogrammed to reflect the revised seat orientation.

Off aircraft communication 188 is transmitted through an aircraft antenna to an appropriate air-to-ground communication system, such as provided by the North American Telephone Systems (NATS) or the terrestrial flight telecommunications system (TFTS) in Europe or through a variety of appropriate satellite communications systems. Data and telephony may then flow to and from the aircraft according to the normal protocol for these types of systems.

An onboard internet mass storage unit 190 is pre-loaded, typically before the aircraft becomes airborne, with the current content of a number, for example several thousand, of the most common internet sites. Some time critical information such as stock quotes, sporting scores, weather and news may be updated dynamically during flight via the air-to-ground communications link 188. During flight, the individual passengers may access this content through the high-speed communication lines of the seat-to-seat cable.

Preferably, the internet mass storage unit 190 contains about 18 gigabytes of storage, enough to store approximately 10,000 internet sites. An internet server 192, interfaces with the network controller 186 to deliver the internet content to the proper passenger.

A video reproducer unit 194 stores multiple videos in any desirable format, such as tape or compact disc and transmits the video input through the high-speed communication lines.

The high-speed communication lines have a band width capable of supporting multi-channel video distribution. The video signals may be distributed as a broadcast signal, as video on demand or as near video on demand. It is anticipated that multiple video reproducer units may be employed on the same aircraft generating a digital output providing passengers with a minimum of 12 video channels.

The video system is anticipated as providing a minimum of 2 stereo channels per video channel to support dual language audio for each channel of video and at least one 3-channel system for distributing tri-lingual stereo audio tracks. Ambient noise cancellation may be provided to the audio portion of the video tracks if desired.

One or more, and typically multiple, audio reproducer units 196 generate multiple, typically on the order of 24, discrete audio channels. The audio output may be in analog format in accordance with ARINC (Aeronautical Radio Incorporated) 628 (Cabin Equipment Interfaces (CEI), Parts 1–4B, Cabin Management and Entertainment System) or, preferably, in a digital format. Of the 24 discrete audio channels, it is anticipated that 16 of the channels will constitute 8 stereo audio programs and the remaining 8 channels 8 monaural channels. The system provides sound in a dynamic range of from 20 Hz to 20 KHz such that the audio signal provided at the passenger outlets will be of CD quality.

ARINC standards may be obtained from: ARINC Inc., 2551 Riva Rd., Annapolis, MD 21401-7465. An exemplary listing of ARINC standards is shown is FIGS. 10*a*–10*o*.

Aircraft systems 198 provide data to the passenger concerning the aircraft flight. Such data may include the time of day, the flight number, the aircraft tail number, the altitude, the air speed, the heading, temperature, position and estimated time of arrival. Other information, such as the status of connecting flights may also be provided.

Additional video inputs including a map of the flight route with the aircraft superimposed over its present position, television programs or a camera providing a view similar to that of the aircraft pilot may be offered to the passenger.

An in-flight work station 200 is available for the flight crew to select which programming is available to passengers. Such in-flight programming may include the selection of video and audio programs, enabling and disabling of laptop power and the selection of passenger information such as flight safety information, connecting flight gates and flight status. This in-flight workstation may also be used by the flight crew to access several on and off aircraft services. Such services may include access to the Internet, company and personal email, airline operation databases and reporting to airline operation centers. Another application for this workstation is as a maintenance terminal to help identify faulty components of the system for repair or replacement.

FIG. 11 schematically illustrates the airborne Internet server, a combination of the network controller and the Internet server, in more detail.

While there are many different methods to enable the individual passengers to communicate with the head end controller and, if necessary, communicate off aircraft, FIG. 12 illustrates schematically one communication embodiment. The passenger, through personal computer 226, transmits a request using any software program that communicates utilizing point to point protocol (PPP) and communicates with a serial line communications port such as an RS 232 port or USB. While not intended to be all encompassing, suitable communication programs include Outlook by Microsoft (Redmond, Wis.), Outlook Express by Microsoft, Eudora Pro by Qualcomm (San Diego, Calif.), Lotus CC: Mail by Lotus Development Corporation (Cambridge, Mass.), Netscape Communicator by Netscape (Mountain View, Calif.) and Internet Explorer by Microsoft.

Utilizing point to point protocol, the personal computer 226 communicates with network interface card 228. The network interface card is a component of the data network interface module located in an integrated seatbox. The network interface card 228 facilitates by communication with the personal computer by simulating a modem interface. An exemplary network interface card operating as an RTOS is VxWORKs.

Among the functions of the network interface card are identifying the seat group and appending a packet routing number to the data generated by personal computer 226 so that any response may be properly routed and managing the connection between the personal computer and the data management system.

From the network interface card 228, the information is transmitted in transmission control protocol/internet protocol (TCP/IP) over the high-speed communication lines of the seat-to-seat cable to network controller 186. The network controller manages the routing of information and the configuration of the network interface card 228. Additionally, the network controller 186 may provide a maintenance portal to the data management system.

If the information sought by the personal computer operator relates to the aircraft systems 198, then the desired information is transmitted via ARINC 429/485 (Mark 33 Digital Information Transfer System) back to the network controller for transmission back to personal computer 226. If the information desired requires communication with the Internet or a ground based server, the network controller 186 may route the information a number of different ways. The information may be transmitted 230 by either proprietary or standard air to ground protocol such as Airnet (Redmond, Wis.) protocol (ANETP) and transmitted to a ground server 232. The ground server manages the communications between the aircraft and the Internet and caches email and Internet data for transmission back to the network controller 186 at the appropriate time utilizing Linux, an operating system that transmits data packets at spaced intervals, rather than in real time.

Alternatively, the network controller 186 communicates in TCP/IP, preferably over a 100 base T-line, to on-aircraft internet server 192. The on-aircraft internet server 192 caches web pages and email until the appropriate time to transmit the information off the aircraft. In addition, the on-aircraft internet server can authenticate the information coming on and off aircraft and also provide for the collection of connection fees.

On-aircraft internet server 192 at the appropriate time transmits the cached messages to a cabin telephony unit 234 over a standard telephony line such as CEPT-E1, a worldwide telephony standard, using ARINC 741 (Aviation Satellite Communication System) protocol. The cabin telephony unit 234 communicates with aircraft antenna 236 that transmits the information to a commercial telephony ground-based system such as the North American Telephone System (NATS) or the European Terrestrial Flight Telecommunication System (TFTS). The ground-based system transmits the data via a Public Switch Telephone Network (PSTN) to an internet 238 provider.

In an alternative embodiment, on-aircraft internet server 192 transmits the information via either a CEPT-E1 line, a modem or an ARINC 429 line to a satellite communication data unit 240. The satellite communication data unit 240 transmits the information by means of aircraft antenna 236' to a commercial data transmitting satellite grid such as INMARSAT. A member satellite 242 transmits the data to a ground-base station 244 for transmission to a PSTN 246 and from there to the internet. As in the preceding embodiment, the ground server 232 transmits information between the internet 238 and the on-aircraft internet server 192.

While particularly described for the management of data on an aircraft, the system of the invention is equally useful for other venues in which a large number of people are positioned in identifiable locations, such as on a passenger ship, bus or train. In addition, the system may be used in fixed venues such as auditoriums, class rooms, hotels and dormitories.

It is apparent that there has been provided in accordance with this invention an aircraft data management system that fully satisfies the objects, features and advantages set forth hereinabove. While the invention has been described in combination with the embodiments thereof, it is evident that many alternatives, modifications and variations will be apparent to those skilled in the art in light of the foregoing description. Accordingly, it is intended to embrace all such alternative modifications and variations as fall within the spirit and broad scope of the appended claims.

We claim:

1. A data management system for supplying data to selected ones of identifiable seats comprising:
   (a) a plurality of data sources;
   (b) a least one power source;
   (c) an integrated seat box that is disposed proximate to a group of said identifiable seats, said integrated seat box being capable of converting at least one of said data and said power to a form useful to a passenger occupying one of said identifiable seats;
   (d) a data network interface module coupled to said integrated seat box, said data network interface module being fault tolerant such that a failure at one seat box does not interfere with the normal operation of successive data network interface modules, said data network interface module including a power distributing physical layer that is galvanically isolated from a data distributing microprocessor;
   (e) a network controller capable of managing said plurality of data sources; and
   (f) a seat-to-seat cable having therein data communication lines and power supply line whereby both data from said plurality of data sources and power from at least one power source are routed by said network controller to selected ones of said identifiable seats.

2. The data management system of claim 1 wherein said integrated seat box contains a plurality of independently removable function modules and one of said independently removable function modules is said data network interface module.

3. The data management system of claim 2 wherein at least one of said removable function modules is selected from the group consisting of in seat power supply, audio, video, noise cancellation, telephony, and combinations thereof, installed in said integrated seat box.

4. The data management system of claim 3 wherein said plurality of independently removable modules includes an in seat power supply module that converts 115 volt, 3 cycle, AC power to 11–16 volt dc power.

5. The data management system of claim 4 wherein said in seat power supply module includes an enable circuit whereby said 11–16 volt dc power is only provided to an outlet if a predetermined minimum threshold power requirement is satisfied.

6. The data management system of claim 3 wherein said plurality of independently removable modules includes an audio function module having an outlet for receiving a digital passenger control unit.

7. The data management system of claim 6 wherein said digital passenger control unit contains an outlet for receiving a passenger's headset.

8. The data management system of claim 7 wherein said passenger's headset includes a microphone enabling two-way telephony communication.

9. The data management system of claim 8 wherein said digital passenger control unit contains a keyboard and said audio module supports telephony whereby said passenger may communicate with a public switch telephone network via a combination of said headset and microphone.

10. The data management system of claim 8 wherein said telephony module interfaces with a cradle effective to deactivate an antenna of a cellular telephone, but permits a passenger to communicate with a public switch telephone network via said cellular telephone and said telephony module.

11. The data management system of claim 3 wherein said seat-to-seat cable interconnects a plurality of said integrated seat boxes both to others of said integrated seat boxes and to a head end portion.

12. The data management system of claim 11 wherein said seat-to-seat cable includes at least one of said power supply lines and at least one of said data communication lines electrically isolated from each other and disposed within a common overall jacket.

13. The data management system of claim 12 wherein said communication line is capable of transmitting at least 400 megabits per second of data.

14. The data management system of claim 13 wherein said at least one data communication line comprises four insulated copper wires twisted together.

15. The data management system of claim 13 wherein said at least one power supply line supports 3 phase AC current, a ground and a neutral.

16. The data management system of claim 13 installed on an aircraft wherein said head end portion includes a master control unit effective to conduct aircraft power to said seat-to-seat cable, a network controller effective to control the flow of multiple streams of data between selected devices and selected passengers and an internet server capable of controlling the flow of multiple streams of data between a mass storage unit server and selected passengers.

17. The data management system of claim 16 wherein said mass storage unit is on said aircraft and contains at least 18 gigabytes of storage.

18. The data management system of claim 17 further including an in-flight workstation interfacing with said head end portion effective for at least one function selected from the group consisting of disabling defective integrated seat boxes, disabling the use of integrated seat boxes connected to incompatible personal devices, disabling the delivery of video, and disabling the delivery of power.

19. A data management system for supplying data to selected ones of identifiable seats comprising:
   (a) a plurality of data sources;
   (b) a least one power source;
   (c) an integrated seat box that is disposed proximate to a group of said identifiable seats, said integrated seat box being capable of converting at least one of said data and said power to a form useful to a passenger occupying one of said identifiable seats;
   (d) a data network interface module coupled to said integrated seat box, said data network interface module capable of effecting a data transfer in real-time between a selected passenger and a head end controller;
   (e) a network controller capable of managing said plurality of data sources; and
   (f) a seat-to-seat cable having therein data communication lines and power supply lines whereby both data from said plurality of data sources and power from at least one power source are routed by said network controller to selected ones of said identifiable seats.

20. The data management system of claim 19 wherein said data network interface module assigns a group routing tag to data originating with said selected passenger.

21. The data management system of claim 19 wherein said integrated seat box contains a plurality of independently removable function modules and one of said independently removable function modules is said data network interface module.

22. The data management system of claim 21 wherein at least one of said removable function modules is selected from the group consisting of in seat power supply, audio, video, noise cancellation, telephony, and combinations thereof, installed in said integrated seat box.

23. The data management system of claim 22 wherein said plurality of independently removable modules includes an in seat power supply module that converts 115 volt, 3 cycle, AC power to 11–16 volt dc power.

24. The data management system of claim 23 wherein said in seat power supply module includes an enable circuit whereby said 11–16 volt dc power is only provided to an outlet if a predetermined minimum threshold power requirement is satisfied.

25. The data management system of claim 22 wherein said data network interface module is fault tolerant such that a failure at one seat box does not interfere with the normal operation of successive data network interface modules.

26. The data management system of claim 25 wherein said data network interface module includes a power distributing physical layer that is galvanically isolated from a data distributing microprocessor.

27. The data management system of claim 22 wherein said plurality of independently removable modules includes an audio function module having an outlet for receiving a digital passenger control unit.

28. The data management system of claim 27 wherein said digital passenger control unit contains an outlet for receiving a passenger's headset.

29. The data management system of claim 28 wherein said passenger's headset includes a microphone enabling two-way telephony communication.

30. The data management system of claim 29 wherein said digital passenger control unit contains a keyboard and said audio module supports telephony whereby said passenger may communicate with a public switch telephone network via a combination of said headset and microphone.

31. The data management system of claim 29 wherein said telephony module interfaces with a cradle effective to deactivate an antenna of a cellular telephone, but permits a passenger to communicate with a public switch telephone network via said cellular telephone and said telephony module.

32. The data management system of claim 22 wherein said seat-to-seat cable interconnects a plurality of said integrated seat boxes both to others of said integrated seat boxes and to a head end portion.

33. The data management system of claim 32 wherein said seat-to-seat cable includes at least one of said power supply lines and at least one of said data communication lines electrically isolated from each other and disposed within a common overall jacket.

34. The data management system of claim 33 wherein said communication line is capable of transmitting at least 400 megabits per second of data.

35. The data management system of claim 34 wherein said at least one data communication line comprises four insulated copper wires twisted together.

36. The data management system of claim 34 wherein said at least one power supply line supports 3 phase AC current, a ground and a neutral.

37. The data management system of claim 34 installed on an aircraft wherein said head end portion includes a master control unit effective to conduct aircraft power to said seat-to-seat cable, a network controller effective to control the flow of multiple streams of data between selected devices and selected passengers and an internet server capable of controlling the flow of multiple streams of data between a mass storage unit server and selected passengers.

38. The data management system of claim 37 wherein said mass storage unit is on said aircraft and contains at least 18 gigabytes of storage.

39. The data management system of claim 38 further including an in-flight workstation interfacing with said head end portion effective for at least one function selected from the group consisting of disabling defective integrated seat boxes, disabling the use of integrated seat boxes connected to incompatible personal devices, disabling the delivery of video, and disabling the delivery of power.

* * * * *